United States Patent
Toyoda

(10) Patent No.: US 6,856,336 B2
(45) Date of Patent: Feb. 15, 2005

(54) COLOR IMAGE FORMING APPARATUS WITH COLOR REGISTRATION DETECTOR

(75) Inventor: Koji Toyoda, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/291,380

(22) Filed: Nov. 12, 2002

(65) Prior Publication Data

US 2003/0095173 A1 May 22, 2003

(30) Foreign Application Priority Data

Nov. 22, 2001 (JP) ......................... 2001-357016

(51) Int. Cl.$^7$ .............................................. G03G 15/01
(52) U.S. Cl. ....................................... 347/116; 347/234
(58) Field of Search ............................... 347/116, 234, 347/242, 244, 257, 258, 259; 359/204, 205, 206, 207

(56) References Cited

U.S. PATENT DOCUMENTS 5,850,306 A * 12/1998 Fukutome et al. .......... 359/204
6,266,174 B1 * 7/2001 Aoki .......................... 359/204
6,323,955 B1 * 11/2001 Kanai et al. ............... 358/1.17

FOREIGN PATENT DOCUMENTS

| JP | 6-18796 | | 1/1994 |
|---|---|---|---|
| JP | 8-50385 | | 2/1996 |
| JP | 9-159944 | A * | 6/1997 |
| JP | 11-64754 | A * | 3/1999 |
| JP | 2000-258713 | | 9/2000 |
| JP | 2001-117040 | A * | 4/2001 |
| JP | 2001-150722 | | 6/2001 |

* cited by examiner

Primary Examiner—Joan Pendegrass
(74) Attorney, Agent, or Firm—Fitzpatrick, Cella, Harper & Scinto

(57) ABSTRACT

Disclosed is a scanning optical apparatus which can reduce color misregistration in a sub scanning direction to thereby obtain a good color image output, and a color image forming apparatus using the same. In the scanning optical apparatus, a beam emitted from light source means 1 is deflected by deflecting means 5, and the beam deflected by the deflecting means is imaged in a spot shape on a surface 7 to be scanned by scanning optical device, and light-scans on the surface to be scanned, and a scanning line scanning on the surface to be scanned has two or more extremums within the effective range of a scanning area.

8 Claims, 19 Drawing Sheets

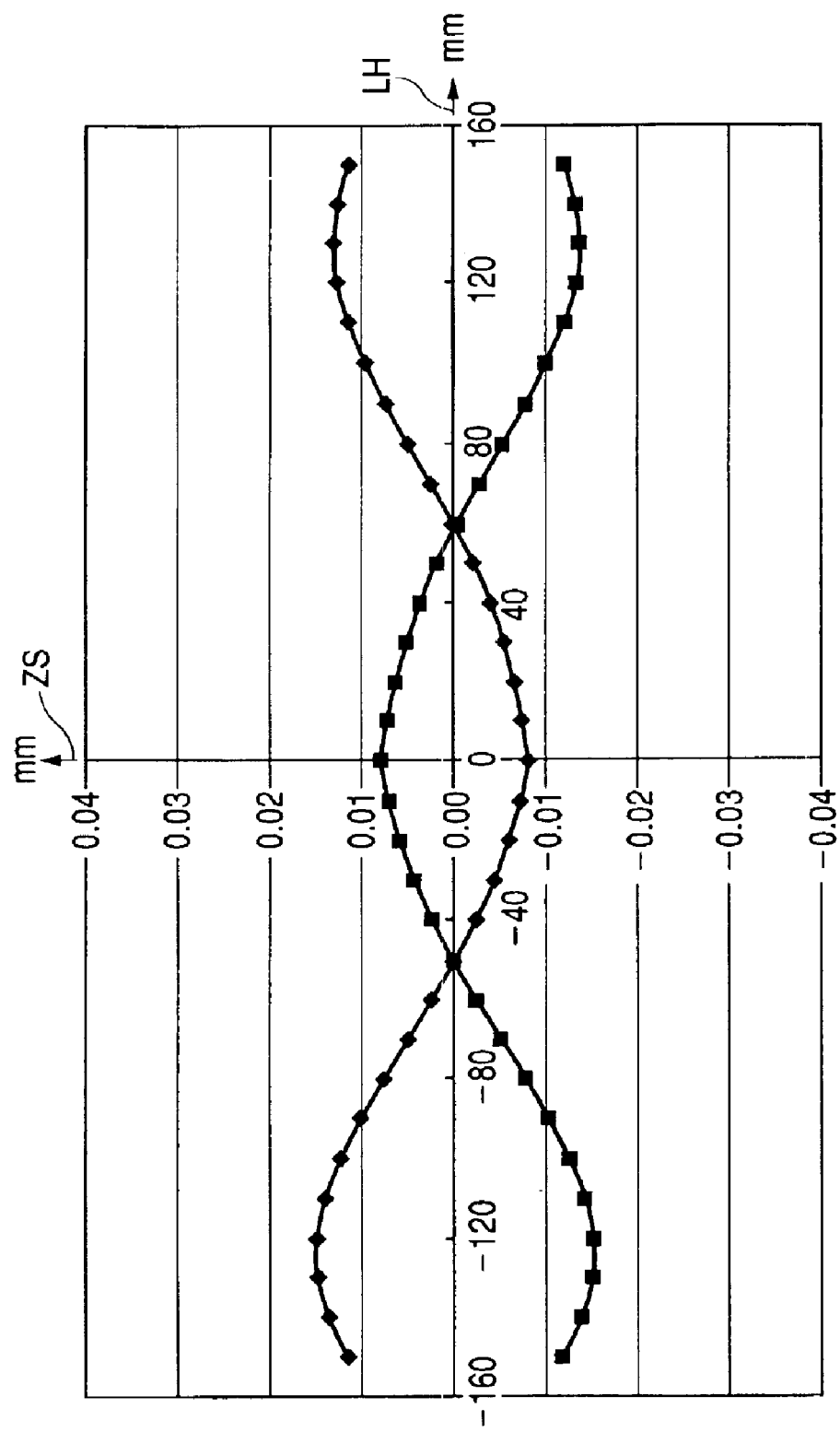

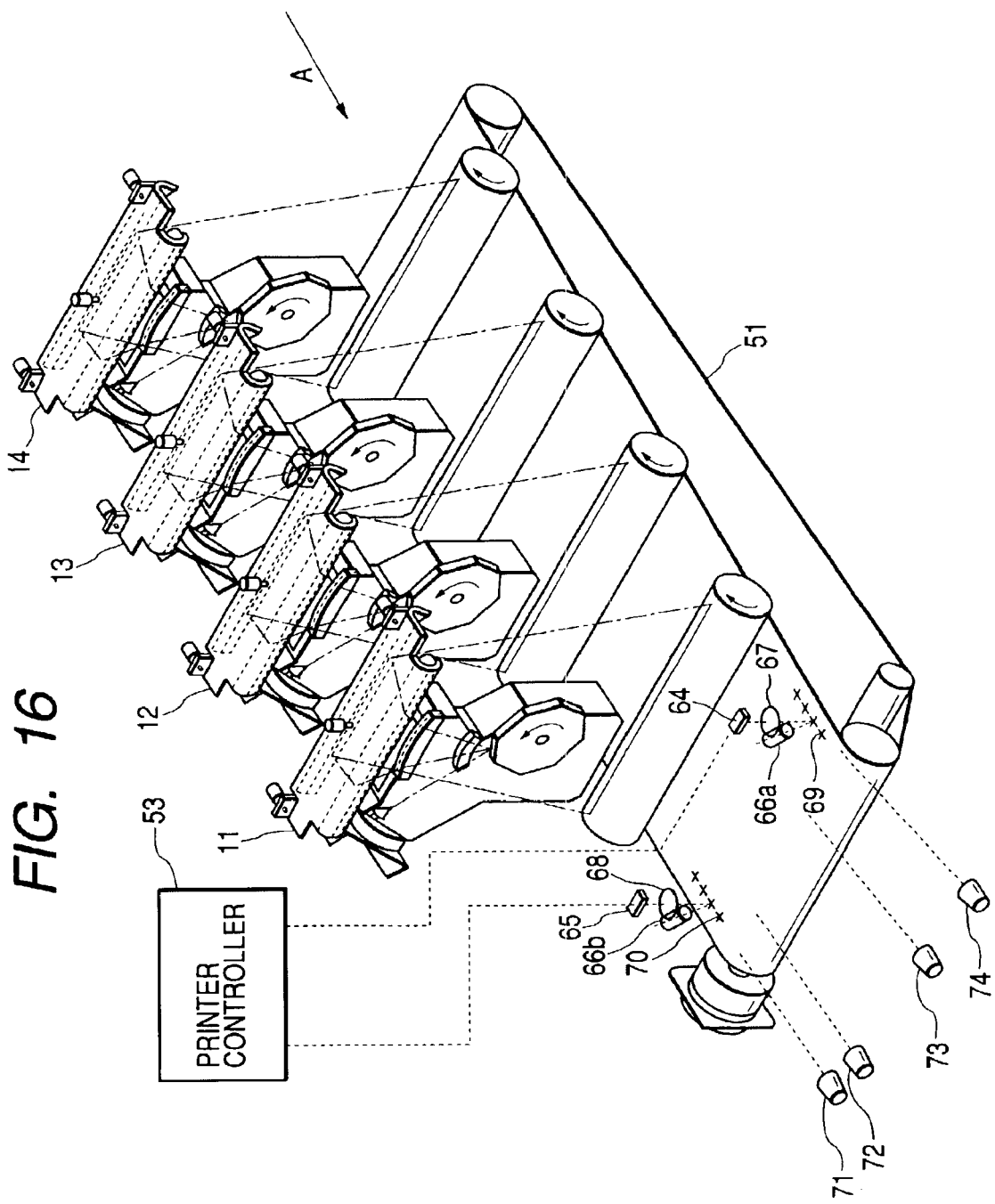

d: COLOR MISREGISTRATION IN SUB SCANNING DIRECTION d: COLOR MISREGISTRATION IN SUB SCANNING DIRECTION d: COLOR MISREGISTRATION IN SUB SCANNING DIRECTION d: COLOR MISREGISTRATION IN SUB SCANNING DIRECTION d : COLOR MISREGISTRATION IN SUB SCANNING DIRECTION

COLOR IMAGE FORMING APPARATUS WITH COLOR REGISTRATION DETECTOR

BACKGROUND OF THE INVENTION

1. Field of the Invention

This invention relates to a scanning optical apparatus and a color image forming apparatus using the same, and particularly is suitable for a color image forming apparatus such as a color laser beam printer having for example, the electrophotographic process, a color digital copying machine or a multifunction printer using a plurality of scanning optical apparatuses and using a plurality of image bearing members (photosensitive drums) to form a color image.

2. Related Background Art

Heretofore, in the scanning optical apparatus of a laser beam printer, a digital copying machine, a multifunction printer or the like, a beam light-modulated in conformity with an image signal and emitted from light source means has been periodically deflected by a light deflector comprising, for example, a rotary polygon mirror, and has been converged into a spot shape on the surface of a photosensitive recording medium (photosensitive drum) by a lens system having an fθ characteristic, and the surface of the recording medium has been light-scanned to thereby effect image recording.

FIG. 17 of the accompanying drawings is a schematic view of the essential portions of a conventional scanning optical apparatus. In FIG. 17, a divergent beam emitted from light source means 91 is made into a substantially parallel beam or a convergent beam by a collimator lens 92, and this beam (the quantity of light) is shaped by an aperture stop 93 and enters a cylindrical lens 94 having refractive power only in a sub scanning direction. The beam having entered the cylindrical lens 94 in a scanning cross section emerges in its intact state, and in a sub scanning cross section is converged and imaged as a substantially linear image near the deflecting surface 95a of a light deflector 95 comprising a rotary polygon mirror.

The beam reflected and deflected by the deflecting surface 95a of the light deflector 95 is directed onto a photosensitive drum surface as a surface 97 to be scanned by a lens system (scanning optical means) 96 having an fθ characteristic through a turn-back mirror 98, and the light deflector 95 is rotated in the direction of arrow A to thereby light-scan the photosensitive drum surface 97 in the direction of arrow B (scanning direction) and effect the recording of image information.

Herein, the direction in which the beam is reflected and deflected (deflected and scanned) by the light deflector is defined as the scanning direction, and the direction orthogonal to the optical axis of the scanning optical means and the scanning direction is defined as the sub scanning direction.

As conventional color image forming apparatuses such as a color laser beam printer and a color digital copying machine, there have been proposed various ones having a plurality of image bearing members (photosensitive drums) corresponding to the respective colors (yellow:Y, magenta:M, cyan:C, and black:Bk) of an output image.

Here, the color image forming apparatus comprises a construction in which for example, a plurality of above-described conventional scanning optical apparatuses corresponding to the respective image bearing members are disposed, or a construction in which a plurality of scanning optical apparatuses which can scan a plurality of image bearing members at a time.

For example, in Japanese Patent Application Laid-Open No. 8-50385, photosensitive drums which are four image bearing members corresponding to respective colors, i.e., yellow, magenta, cyan and black, are disposed and a scanning optical apparatus is disposed for each photosensitive drum. Images of the respective colors are superimposed on a conveyance belt to thereby form a desired color image.

In Japanese Patent Application Laid-Open No. 6-18796, two scanning optical apparatuses each of which can scan two photosensitive drums at a time are disposed for photosensitive drums which are four image bearing members corresponding to the respective colors to thereby form a desired color image.

When a color image is to be formed by the use of a plurality of scanning optical apparatuses, the positions of spots (dots) imaged on the image bearing members by the respective scanning optical apparatuses must be made coincident relative to one another in a whole scanning area in both of the scanning direction and the sub scanning direction. That is, it becomes necessary that in the scanning direction, the intervals among the spots be uniform and in the sub scanning direction, the inclination or curvature of the scanning line or the line intervals be uniform.

Unless the relative coincidence of the positions of the spots is made, when images are superimposed on the conveyance belt, the quality of an output image is degraded as color misregistration. Accordingly, it is important that the scanning apparatus is uniform and that the positional relationship between a scanning optical apparatus and an image bearing member corresponding thereto is coincident in each apparatus.

For example, in the above-mentioned Japanese Patent Application Laid-Open No. 8-50385, a color image is formed by the use of four scanning optical apparatuses and four image bearing members corresponding thereto. Here, it is desirable that relative to a dot formed on an image bearing member by a scanning optical apparatus, dots formed by the three other scanning optical apparatuses corresponding to this dot be all uniform when they are superposed on the conveyance belt.

In an actual scanning optical apparatus, however, the deviation between the above-mentioned dot positions occurs due to the accuracy errors of optical parts, the single piece accuracy error of a mechanical part to which an optical part such as an optical box is assembled, the assemblage error of the optical part and the error of the relative position between the scanning optical apparatus and the image bearing member.

When all of the four scanning optical apparatuses have the same various errors, any dot position deviation will not be brought about, but yet usually they have different errors and therefore this will cause color misregistration. Therefore a color image obtained will be one having color misregistration in the scanning direction and the sub scanning direction.

Japanese Patent Application Laid-Open No. 2001-150722 discloses an invention in which color misregistration in the scanning direction is taken up as a problem.

The color misregistration in the sub scanning direction in an optical factor can be broadly divided into two factors, i.e., a scanning line inclination component and a curvature component. For example, in the scanning optical apparatus shown in FIG. 17, if distortion occurs in the optical surface of the scanning optical means 96 and there is a single piece accuracy error or a lens is mounted in a state in which it is tilted in the axial direction parallel to the optical axis due to an assemblage error relative to the optical box, the dot position in the sub scanning direction comes to have an inclination component in the scanning line as shown in FIG. 18.

Here, for the simplification of description, it is to be understood that a phenomenon is typified regarding the color misregistration components of two of the four colors.

Assuming in FIG. 18 of the accompanying drawings that of the two colors is cyan (C) and the other is magenta (M), scanning line inclination occurs to both of the two colors: It is because unevenness occurs to error components such as a single piece accuracy error and an assemblage error that in FIG. 18, the amounts of inclination of the two colors differ from each other. If both of cyan and magenta have the same error component, that is, have an error from their ideal state, but there is no unevenness in that state, they also have the same amount of inclination and therefore there can be obtained a color image free of color misregistration.

Actually, however, both error factors have unevenness and therefore, the unevenness causes color misregistration. In order to reduce the color misregistration, in the conventional scanning optical apparatus, an adjusting mechanism is provided and for example, the whole of each scanning optical apparatus is inclined to thereby effect adjustment so that the scanning line may be adjusted to an ideal position.

When there occurs such a scanning line inclination as shown in FIG. 18, the inclination is adjusted about an axis parallel to the optical axes, for example, of the scanning optical apparatuses for cyan and magenta, whereby finally the inclination components of the two colors are made coincident with each other as shown in FIG. 19 of the accompanying drawings to thereby correct the color misregistration.

Likewise, when the lens has a single piece accuracy error, or when the lens is mounted in a state in which it is tilted or shifted in the axial direction parallel to the main scanning direction due to the assemblage error relative to the optical box, the dot position in the sub scanning direction comes to have a curvature component in the scanning line, as shown in FIG. 20 of the accompanying drawings.

Assuming as in FIG. 18 that one of the two colors is cyan (C) and the other is magenta (M), scanning line curvature occurs to both of the two colors. It is because unevenness occurs to the error components such as the single piece accuracy error and the assemblage error that in FIG. 20, the amounts of curvature of the two colors differ from each other. If both of cyan and magenta have the same error component, that is, have an error from their ideal state, but there is no unevenness in that state, the two colors come to have the same amount of curvature and therefore there can be obtained a color image free of color misregistration.

Actually, however, each error factor has unevenness and therefore, the unevenness causes color misregistration. In order to reduce the color misregistration, in the conventional scanning optical apparatus, an adjusting mechanism is provided and for example, in Japanese Patent Application No. 2000-258713, the turn-back mirror of a scanning optical apparatus is curved to thereby effect the adjustment of the curvature of a scanning line. That is, when such curvature of the scanning line as shown in FIG. 20 occurs, mirrors disposed in the scanning optical apparatuses for cyan and magenta are curved to thereby effect adjustment.

In such an adjusting method, however, the sensitivity of the mirrors to the curvature of the scanning line is low and therefore it is necessary to give great stress to the mirrors and curve the mirrors themselves and as a result, problems arise in the assemblage accuracy, environmental fluctuations and the accuracy of the adjustment itself, and this is not good.

So, as another method of adjusting the curvature of the scanning line, it is conceived to make at least one of lenses constituting the scanning optical apparatus eccentric. For example, the scanning optical means 96 of FIG. 17 is rotated about an axis parallel to the scanning direction to thereby effect the adjustment of the curvature of the scanning line.

However, when for example, the curvature of the scanning line (cyan:C) before adjustment and the scanning line sensitivity when the scanning optical means 96 is rotated about an axis parallel to the scanning direction are such as shown in FIG. 21 of the accompanying drawings, an error component d after adjustment remains at an intermediate image height. If this error component d remains, when the scanning optical apparatus is combined, for example, with a scanning optical apparatus free of the curvature of the scanning line, an amount of color misregistration a will occur. To completely eliminate this error component, it is necessary that the curvature of the straight, line before adjustment in FIG. 21 and the scanning line sensitivity of the scanning optical means 96 be coincident with each other.

However, the single piece accuracy, the assemblage accuracy, etc. which are the occurrence factors of the curvature of the scanning line occur with unevenness and therefore, there is also the possibility of the curvature of the scanning line before adjustment occurring with a form and an amount differing from those in FIG. 21.

Accordingly, it is very difficult to make the curvature of the scanning line before adjustment and the scanning line sensitivity of the scanning optical means 96 coincident with each other and thus, the error component remains even if the adjustment of the curvature of the scanning line is effected. If this error component is uniform for the four colors, color misregistration will not be brought about, but as described above, the single piece accuracy, the assemblage accuracy, etc. which are the occurrence factors of the curvature of the scanning line occur with unevenness and thus, the error component does not become uniform but occurs with unevenness. Because of this error component, color misregistration in the sub scanning direction is caused in image formation.

Also, in a color image forming apparatus, registration detecting means for each color component to detect a color misregistration component near the conveyance belt is disposed to thereby correct the writing start position in the sub scanning direction. Each scanning optical apparatus transfers a registration mark formed on the image bearing member to the conveyance belt, and the registration detecting means detects the position of this registration mark, whereby the amount of color misregistration in the sub scanning direction is detected. Design is made such that the phase control of the polygon motor is effected correspondingly to each scanning optical apparatus so that the color misregistration at the registration detecting position may be corrected on the basis of this information, and the respective colors are superimposed one upon another.

However, when an attempt is made to correct, for example, the color misregistration of cyan and magenta in which the curvature of the scanning line occurs, if the registration detecting means is disposed at the center of the scanning area, the amount of color misregistration will become null in the central portion of the scanning area but the amount of color misregistration will increase toward the peripheral portion of the scanning area and finally, great color misregistration in the sub scanning direction which is an amount of color misregistration d will occur in the peripheral portion.

When the correction of the four colors is effected, greater color misregistration may occur in the peripheral portion. Also, if conversely to the above-described example, registration detecting means are disposed on the opposite end portions of the scanning area, as shown in FIG. 22 of the accompanying drawings, the amount of color misregistration will become null in the opposite end portions of the scanning area, but the amount of color misregistration will increase toward the central portion of the scanning area and finally, great color misregistration in the sub scanning direction which is an amount of color misregistration d will occur. When the correction of the four colors is thus effected, greater color misregistration may occur in the central portion.

SUMMARY OF THE INVENTION

It is an object of the present invention to provide a scanning optical apparatus which can correct any dot position deviation in the sub scanning direction in the entire scanning area, and can obtain a good color image having little color misregistration component in the sub scanning direction, and a color image forming apparatus using the same.

According to one aspect of the present invention, a scanning optical apparatus comprises:
deflecting means for deflecting a beam emitted from light source means; and
scanning optical means for causing the beam deflected by the deflecting means to be imaged in a spot shape on a surface to be scanned;
characterized in that a scanning line scanning on the surface to be scanned has two or more extremums within the effective range of a scanning area.

The above-described scanning optical apparatus further comprises a scanning line curvature adjusting mechanism, and the two or more extremums of the scanning line are obtained by adjusting the curvature of the scanning line by the scanning line curvature adjusting mechanism.

In the above-described scanning optical apparatus, the scanning line curvature adjusting mechanism tilts or/and shifts one or more of scanning optical elements constituting the scanning optical means to thereby adjust the curvature of the scanning line.

According to another aspect of the present invention, a color image forming apparatus provided with a plurality of above-described scanning optical apparatuses includes a plurality of image bearing members disposed on the surfaces to be scanned of the respective scanning optical apparatuses for forming images of different colors.

The above-described color image forming apparatus may include a printer controller for converting a color signal inputted from an external device into image data of the different colors, and inputting them to the respective scanning optical apparatuses.

In the above-descried color image forming apparatus, two or more registration detecting means for detecting a color misregistration component are disposed at an intermediate image height between the center of a scanning area in an effective scanning area and the end of the effective scanning area in the main scanning direction, and color misregistration correction is effected at the intermediate image height.

When in the main scanning direction, the distance from the center of the scanning area to the end of the effective scanning area is defined as T, and in the main scanning direction, the distance from the center of the scanning area to the detecting position of the registration detecting means is defined as S, the registration detecting means are disposed at such a position as satisfies $0.3|T|<|S|<|T|$.

According to another aspect of the present invention, a scanning optical apparatus comprises:
deflecting means for deflecting a beam emitted from light source means; and
scanning optical means for causing the beam deflected by the deflecting means to be imaged in a spot shape on a surface to be scanned;
characterized in that when the scanning line heights at the positions of four image heights S1, S2, S3 and S4 within the range of an effective scanning area are defined as Zs1, Zs2, Zs3 and Zs4, respectively, a scanning line scanning on the surface to be scanned satisfies the conditions that $$S1<S2<0<S3<S4 \tag{1}$$

$$-0.02 \leq (Zs1+Zs4)-(Zs2+Zs3) \leq 0.02 \tag{2}.$$

The above-described scanning optical apparatus further comprises a scanning line curvature adjusting mechanism, and the mechanism adjusts the curvature of the scanning line so as to satisfy the above-mentioned conditional expressions (1) and (2).

The aforementioned scanning line curvature adjusting mechanism tilts or/and shifts one or more of scanning optical elements constituting the scanning optical means to thereby adjust the curvature of the scanning line.

According to another aspect of the present invention, a color image forming apparatus provided with a plurality of above-described scanning optical apparatuses includes a plurality of image bearing members disposed on the surfaces to be scanned of the respective scanning optical apparatuses for forming images of different colors.

The above-described color image forming apparatus has a printer controller for converting a color signal inputted from an external device into image data of the different colors and inputting them to the respective scanning optical apparatuses.

In the above-described color image forming apparatus, two or more registration detecting means for detecting a color misregistration component are disposed at an intermediate image height between the center of a scanning area in an effective scanning area and the end of the effective scanning area in the main scanning direction, and color misregistration correction is effected at the intermediate image height.

When in the main scanning direction, the distance from the center of the scanning area to the end of the effective scanning area is defined as T, and in the main scanning direction, the distance from the center of the scanning area to the detecting position of the registration detecting means is defined as S, the registration detecting means are disposed at such a position as satisfies $0.3|T|<|S|<|T|$.

BRIEF DESCRIPTION OF THE DRAWINGS

FIG. 9 shows the color misregistration component on the main body of the color image forming apparatus after the adjustment of the curvature of the scanning line when a certain accuracy error of Embodiment 1 of the present invention is added.

FIG. 16 is a schematic view of the essential portions of a color image forming apparatus according to Embodiment 4 of the present invention.

DETAILED DESCRIPTION OF THE PREFERRED EMBODIMENTS (Embodiment 1)

Figure 1:
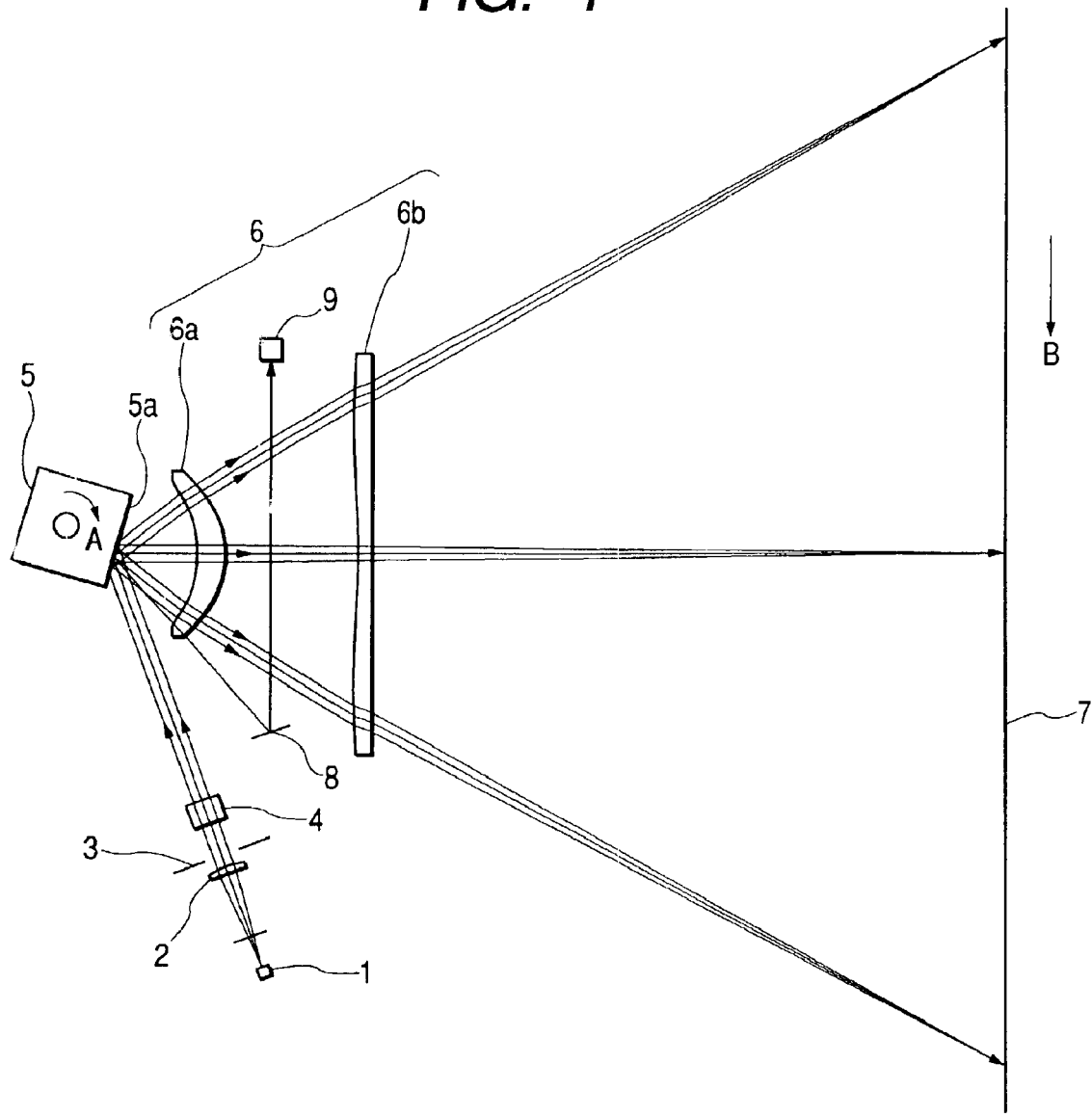
FIG. 1 is a main scanning cross-sectional view of a scanning optical apparatus according to Embodiment 1 of the present invention.

FIG. 1 is a cross-sectional view (main scanning cross-sectional view) in the main scanning direction of the essential portions of Embodiment 1 of the scanning optical apparatus of the present invention.

In FIG. 1, the reference numeral 1 designates light source means comprising, for example, a semiconductor laser or the lie. The reference numeral 2 denotes a condensing lens (collimator lens) which converts a divergent beam emitted from the light source means 1 into a substantially parallel beam or a convergent beam. The reference numeral 3 designates an aperture stop which limits the beam passing therethrough and shapes the beam shape. The reference numeral 4 denotes a cylindrical lens which has predetermined power only in a sub scanning direction, and causes the beam passed through the aperture stop 3 to be imaged as a substantially linear image on the deflecting surface (reflecting surface) 5a of a light deflector 5 which will be described later in the sub scanning cross section. Each of the collimator lens 2, the aperture stop 3 and the cylindrical lens 4 constitutes an element of incidence optical means.

The light deflector 5 as deflecting means comprises, for example, a four-surface polygon mirror (rotary polygon mirror), and is rotated at a constant speed in the direction of arrow A by driving means (not shown) such as a motor.

The reference numeral 6 designates scanning optical means (scanning lens system) which has the light condensing function and an fθ characteristic, and comprises two first and second lenses (lens systems) 6a and 6b, and causes the beam based on image information reflected and deflected by the light deflector 5 to be imaged on a photosensitive drum surface 7 as a surface to be scanned, and makes the deflecting surface 5a of the light deflector 5 and the photosensitive drum surface 7 conjugate with each other in the sub scanning cross section, and thereby has the inclination correcting function.

The reference numeral 8 denotes a synchronism detecting mirror (BD mirror), and the reference numeral 9 designates a synchronism detecting element (BD sensor). In the present embodiment, the timing of the scanning start position for image recording on the photosensitive drum surface 7 is adjusted by the use of a synchronizing signal (BD signal) obtained by detecting an output signal from the BD sensor 9.

In the present embodiment, a divergent beam emitted from the semiconductor laser 1 modulated in conformity with image data from a printer controller (not shown) is converted into a substantially parallel beam or a convergent beam by the collimator lens 2, and this beam (the quantity of light) is limited by the aperture stop 3 and enters the cylindrical lens 4. In the main scanning cross section, the substantially parallel beam having entered the cylindrical lens 4 emerges in its intact state. Also, in the sub scanning cross section, the substantially parallel beam converges and is imaged as a substantially linear image (a line image long in the scanning direction) on the deflecting surface 5a of the light deflector 5. The beam reflected and deflected by the deflecting surface 5a of the light deflector 5 is imaged in a spot shape on the photosensitive drum surface 7 through the first and second lenses 6a and 6b, and the light deflector 5 is rotated in the direction of arrow A to thereby light-scan on the photosensitive drum surface 7 in the direction of arrow B (the scanning direction) at a uniform speed. Thereby, a scanning line is formed on the photosensitive drum surface 7 as a recording medium and image recording is effected.

In the present embodiment, design is made such that the scanning line at this time is placed within the effective range of a scanning area so as to obtain three extremums. (The number of the extremums can be two or more.) The three extremums of this scanning line are obtained by adjusting the curvature of the scanning line by a scanning line curvature adjusting mechanism. The scanning line curvature adjusting mechanism tilts (rotates) the second lens 6b of the lenses constituting the scanning optical means 6 to thereby adjust the curvature of the scanning line.

The extremum means a point at which the inclination of the scanning line is 0.

(Color Image Forming Apparatus)

Figure 2:
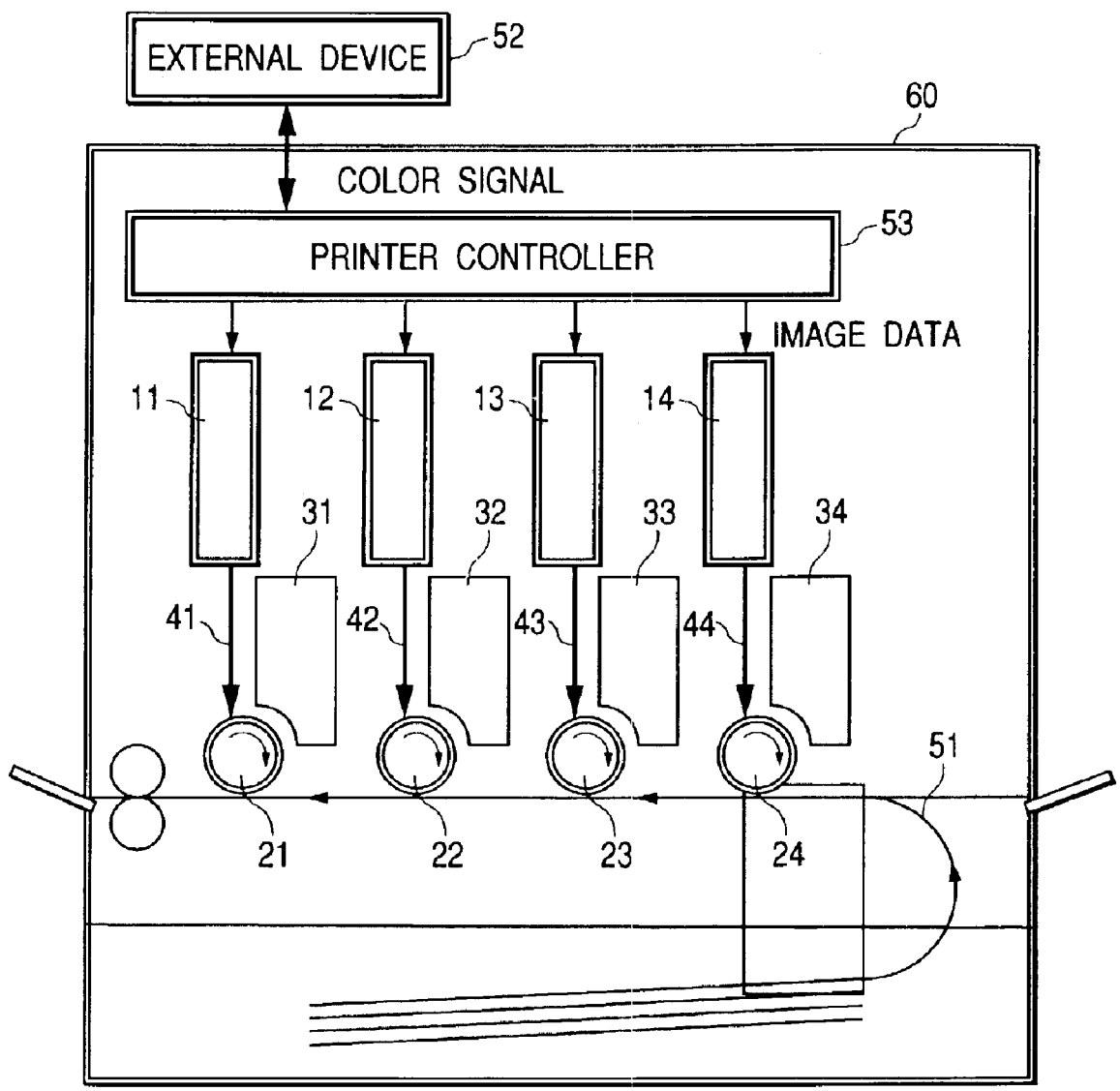
FIG. 2 is a schematic view of the essential portions of a color image forming apparatus according to Embodiment 1 of the present invention.

FIG. 2 is a schematic view of the essential portions of a color image forming apparatus (e.g. a color laser beam printer) when it uses a plurality of scanning optical apparatuses of the present invention.

The present embodiment is a color image forming apparatus of the tandem type in which four scanning optical apparatuses are juxtaposed and image information is recorded on the surfaces of photosensitive drums which are image bearing members. In FIG. 2, the reference numeral 60 designates the color image forming apparatus, the reference numerals 11, 12, 13 and 14 denote scanning optical apparatuses each having the construction of Embodiment 1, the reference characters 21, 22, 23 and 24 designate photosensitive drums as image bearing members, the reference numerals 31, 32, 33 and 34 denote developing devices, and the reference numeral 51 designates a conveyance belt.

In FIG. 2, color signals of R(red), G(green) and B(blue) are inputted from an external device such as a personal computer to the color image forming apparatus 60. These color signals are converted into image data (dot data) of C(cyan), M(magenta), Y(yellow) and B(black) by a printer controller 53 in the apparatus. These image data are inputted to the scanning optical apparatuses 11, 12, 13 and 14. Light beams 41, 42, 43 and 44 modulated in conformity with the respective image data are emitted from these scanning optical apparatuses, and the photosensitive surfaces of the photosensitive drums 21, 22, 23 and 24 are scanned in the main scanning direction by these light beams.

The color image forming apparatus in the present embodiment has four juxtaposed scanning optical apparatuses (11, 12, 13 and 14) corresponding to the respective colors C(cyan), M(magenta), Y(yellow) and B(black), and records image signals (image information) on the surfaces of the photosensitive drums 21, 22, 23 and 24 disposed in parallel to one another to thereby print a color image at a high speed.

The color image forming apparatus in the present embodiment, as described above, forms latent images of the respective colors on the surface of the corresponding photosensitive drums 21, 22, 23 and 24 by the four scanning optical apparatuses 11, 12, 13 and 14 by the use of light beams based on the respective image data. Thereafter, the images are multi-transferred to a recording material to thereby form a full-color image.

As the aforementioned external device 52, use may be made, for example, of a color image reading apparatus provided with a CCD sensor. In this case, a color digital copying machine is constituted by this color image reading apparatus and the color image forming apparatus 60.

(Color Image Forming Apparatus)

Figure 3:
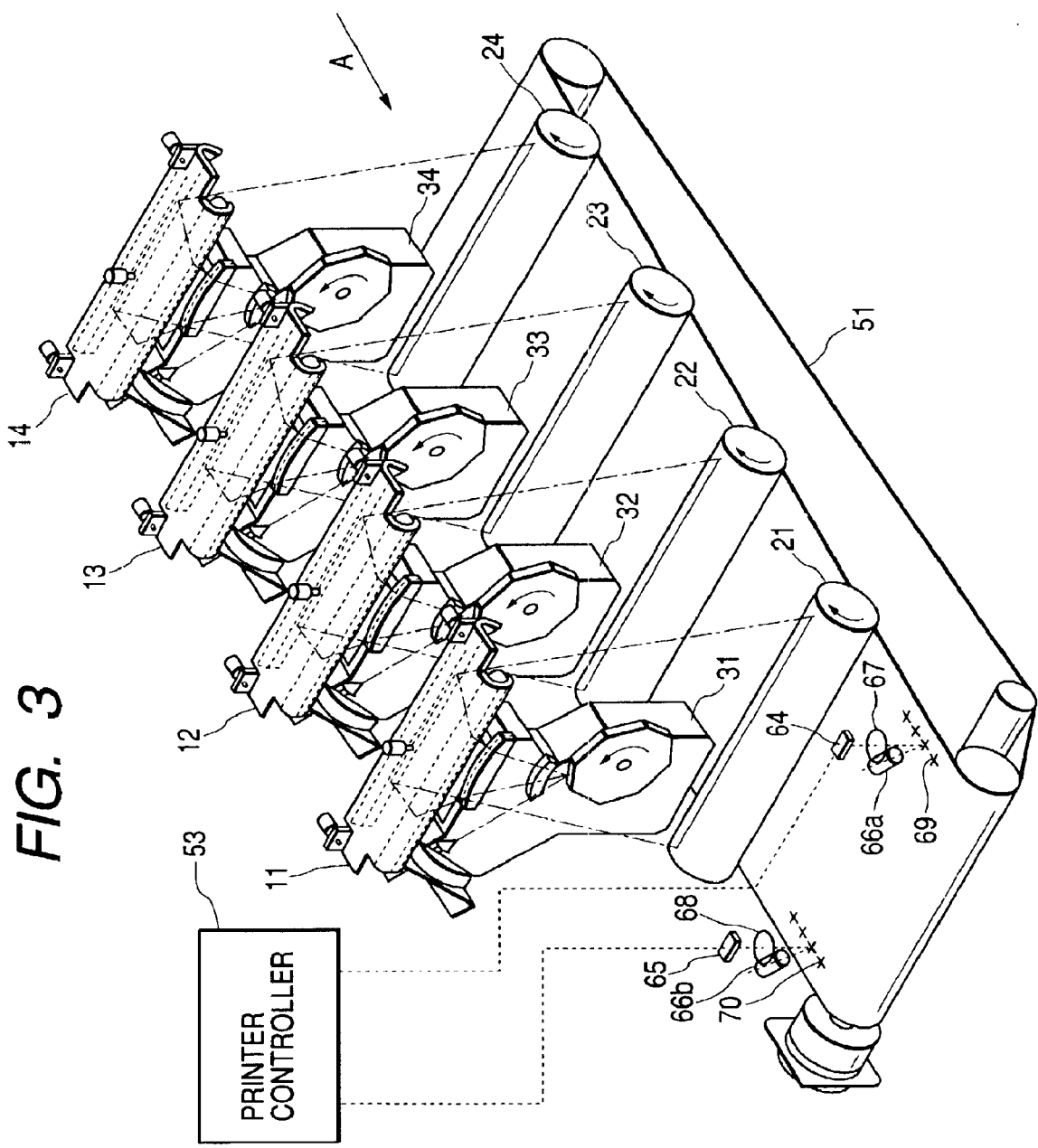
FIG. 3 is a perspective view of the color image forming apparatus according to Embodiment 1 of the present invention.

FIG. 3 is a perspective view of the essential portions of the color image forming apparatus of the present invention shown in FIG. 2. In FIG. 3, the same elements as the elements shown in FIG. 2 are given the same reference characters.

In the present embodiment, latent images are formed on the photosensitive drum surfaces 21 to 24 by the respective scanning optical apparatuses 11 to 14, whereafter registration marks 69 and 70 transferred onto a conveyance belt 51 are detected by registration detecting means (registration mark detectors) 64 and 65, and the reflected lights of the lights projected from light sources 66a and 66b to the registration marks 69 and 70 of the conveyance belt 51 are received through condensing lenses 67 and 68 to thereby detect the positions of the registration marks 69 and 70 in the sub scanning direction and find the amount of position error in the sub scanning direction at the image height whereat the registration detecting means are disposed. Thereafter, the polygon phase control or the like of the scanning optical apparatuses 11 to 14 is effected in conformity with the thus found amount of position error to thereby effect color misregistration correction in the sub scanning direction.

In the present embodiment, two registration detecting means are disposed at the intermediate image height of an effective scanning area in the main scanning direction (the direction Y) and color misregistration correction is effected at the intermediate image height. The intermediate image height is the image height between the center of the scanning area and the end of the effective scanning area. While in the present embodiment, the two registration detecting means 64 and 65 are disposed, this is not restrictive, but three or more registration detecting means may be disposed.

In the present embodiment, a scanning line curvature adjusting mechanism is provided on the second lens 6b of the first and second lenses 6a and 6b constituting the scanning optical means 6. During the assembly of the scanning optical apparatus, detecting means 61 for detecting the position of the scanning line in the height direction (the direction Z) is disposed on the surface 7 to be scanned, and on the basis of the result of the detection obtained by the detecting means 61, the adjustment of the curvature of the scanning line is effected by the use of the second lens 6b.

Figure 4:
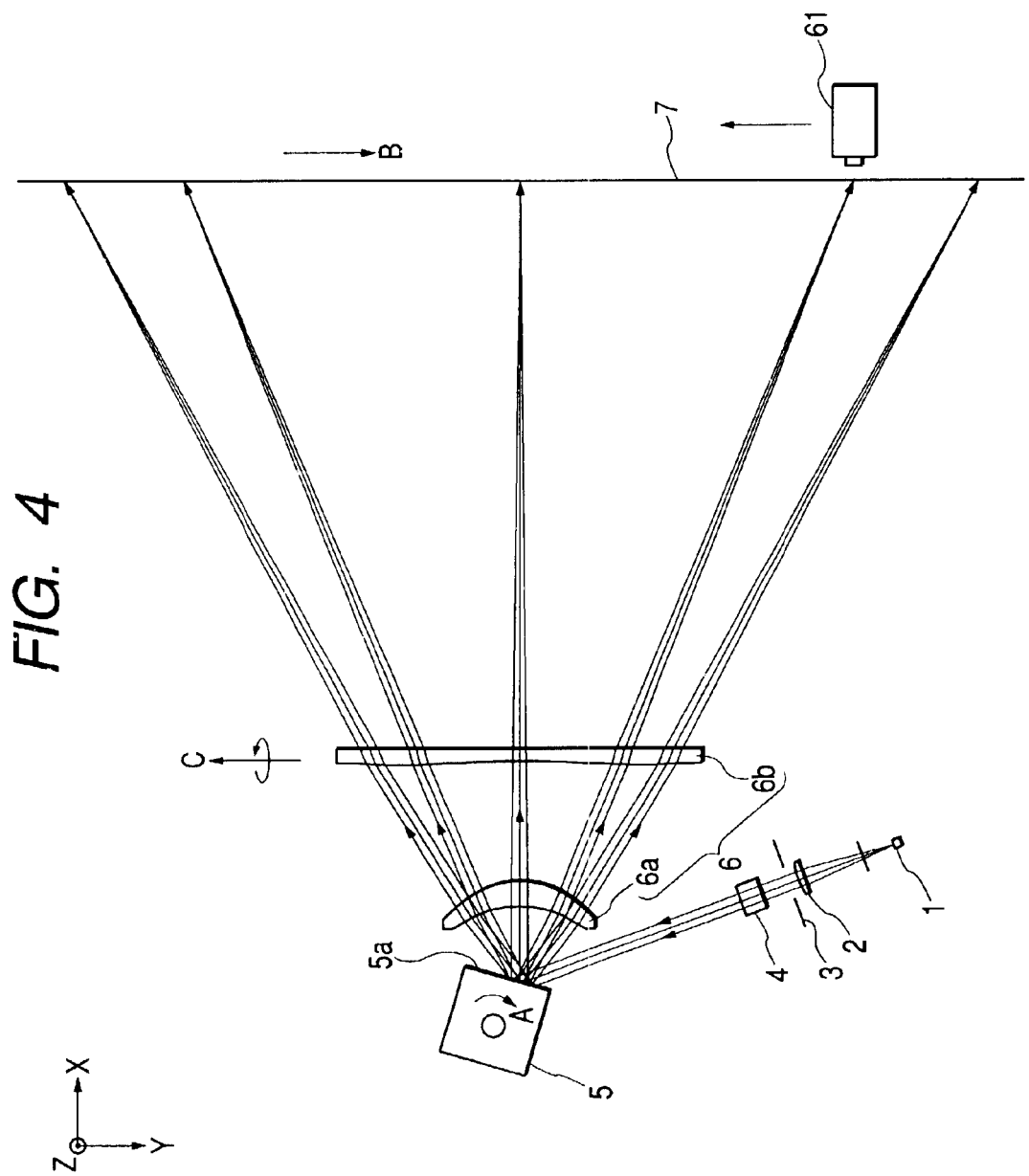
FIG. 4 is a main scanning cross-sectional view of the scanning optical apparatus according to Embodiment 1 of the present invention.

The adjustment of the curvature of the scanning line, as shown in FIG. 4, is effected by the second lens 6b being rotated about an axis C parallel to the scanning direction. At this time, like the occurrence factors of the curvature of the scanning line, there is the high possibility of the inclination of the scanning line being caused at the same time by the single piece accuracy error of each part, the assemblage accuracy error of each part, etc. Accordingly, it is desirable to effect the adjustment of the inclination of the scanning line before the adjustment of the curvature of the scanning line is effected, and effect the adjustment of the curvature of the scanning line with the inclination component eliminated. In FIG. 4, the reference numeral 61 designates the detecting means which detects the position of the scanning line in the height direction thereof.

Figure 5:
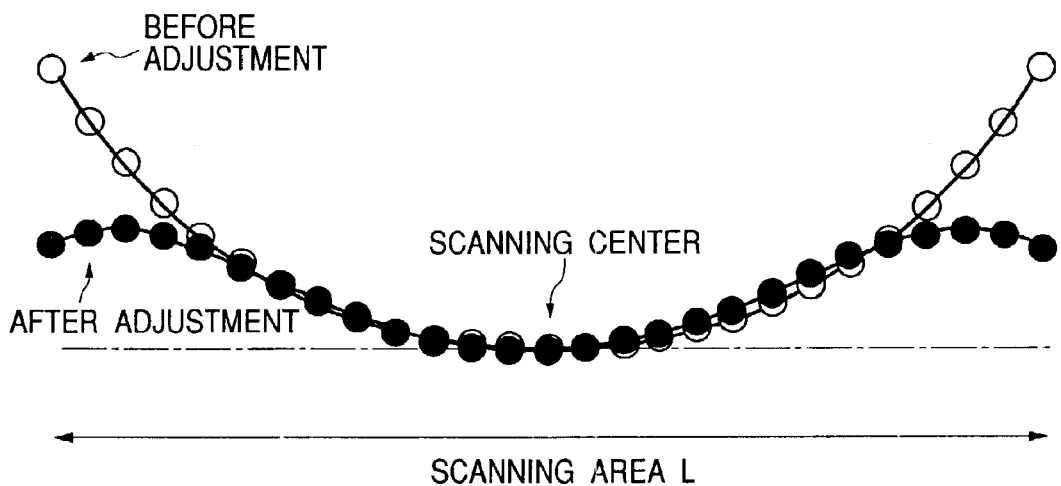
FIG. 5 shows the comparison between before and after the curvature of a scanning line in Embodiment 1 of the present invention.

FIG. 5 shows the states of the curvature of the scanning line before and after the adjustment of the curvature of the scanning line in Embodiment 1 of the present invention.

As shown in FIG. 5, what has been the curvature of the scanning line having an extremum in the central portion of scanning before the adjustment is made into such curvature of the scanning line as has total three extremums in the central portion of scanning and at the right and left intermediate image heights after the adjustment by the adjustment of the curvature of the scanning line in which the second lens 6b is tilted.

Figure 10A:
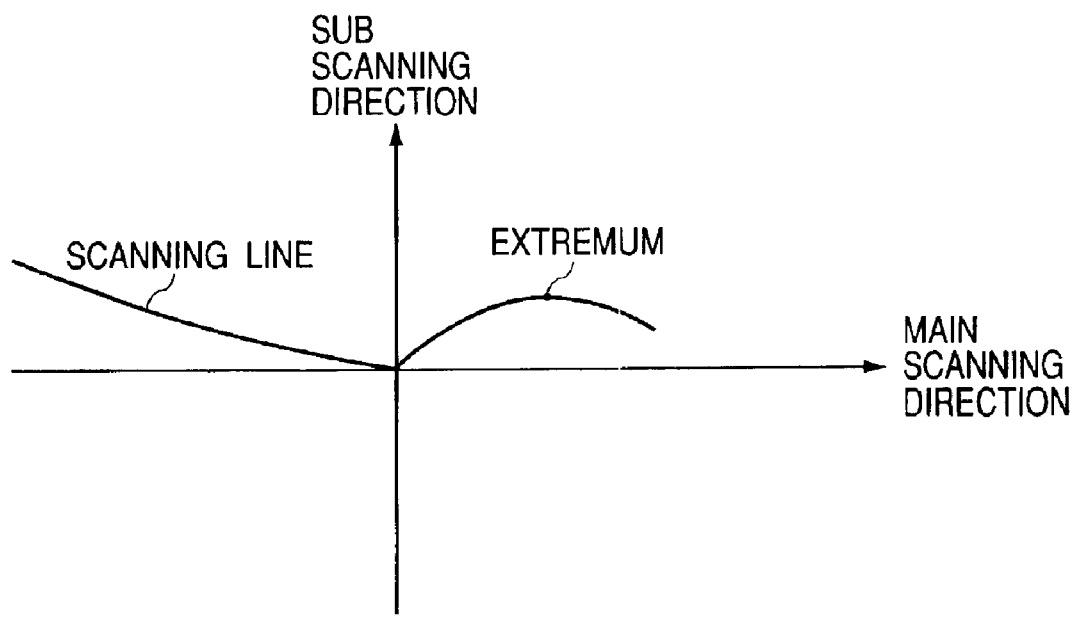
FIGS. 10A and 10B show the curvature of the scanning line in another embodiment of the present invention.
Figure 10B:
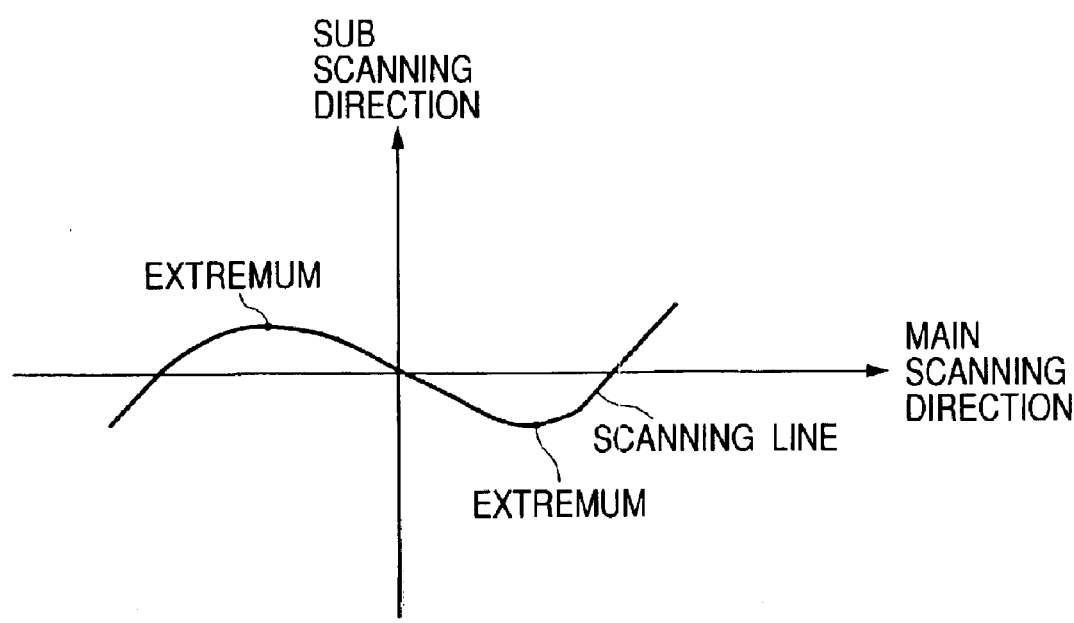

In the present embodiment, design may be made such that as shown in FIG. 10A, the curvature of the scanning line has an extremum only on one side of the effective scanning area relative to the center of the scanning area, or design may be made such that as shown in FIG. 10B, the curvature of the scanning line has extremums on both sides of the effective scanning area relative to the center of the scanning area.

Accordingly, as is apparent from FIG. 5, the difference between the maximum value and minimum value of the curvature of the scanning line is reduced by effecting the adjustment of the curvature of the scanning line, and by this effect, the color misregistration in the sub scanning direction during the final image formation is also reduced.

Figure 6:
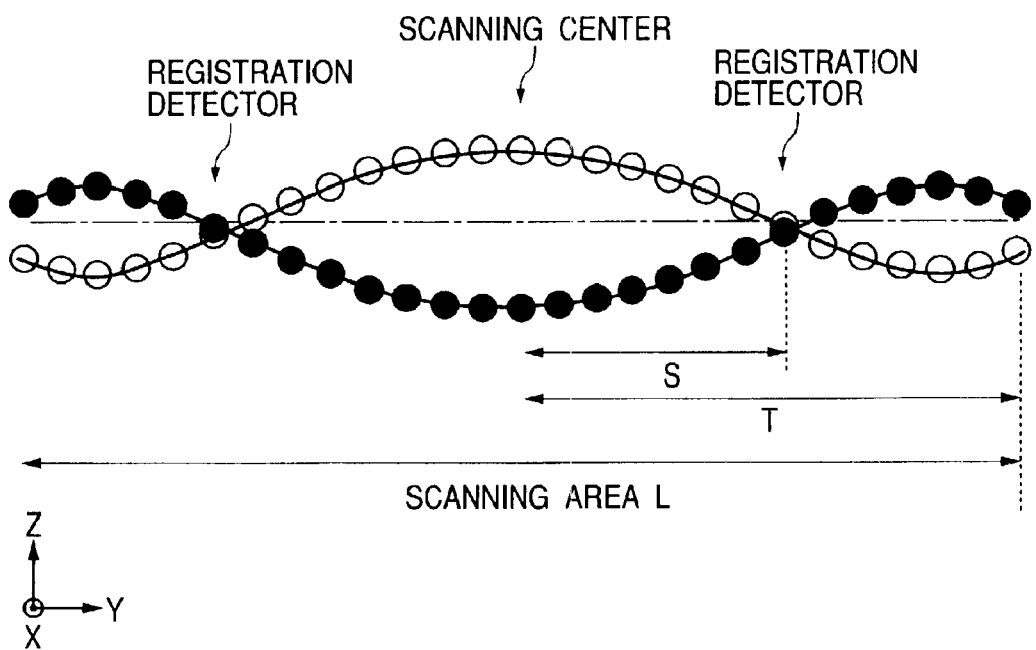
FIG. 6 shows a color misregistration component on the main body of the color image forming apparatus after the adjustment of the curvature of the scanning line in Embodiment 1 of the present invention.

FIG. 6 shows a state in which of the scanning lines of four colors when a color image is formed in Embodiment 1 of the present invention, two colors in which the above-mentioned difference between the maximum value and minimum value of the curvature of the scanning line is greatest and the directions of the curvature of the scanning line are opposite to each other are superimposed one upon the other. This is equal to relating to two colors of which the amount of color misregistration is greatest when four colors are superimposed one upon another.

When the distance from the center of the scanning area to the end of the effective scanning area is defined as T, and the distance from the center of the scanning area to the detecting position of the registration detecting means is defined as S, it is preferable to dispose the registration detecting means at such a position as satisfies $$0.3|T|<|S|<|T|. \qquad (A)$$

When only the registration detection in the sub scanning direction is considered, it is desirable that the image height of the intermediate portion between the maximum value and minimum value of the curvature of the scanning line be the position of the registration detecting means. From the experience hitherto, it is desirable to dispose the registration detecting means at a position in the vicinity |T/2| of the center of the distance T from the center of the scanning area to the end of the effective scanning area. However, the registration detecting means do not effect the registration detection only in the sub scanning direction and usually, effect the registration detection in the scanning direction at the same time. Accordingly, it is necessary to determine the position of the registration detecting means from the viewpoint of both of the main scanning direction and the sub scanning direction.

Also, the registration detecting means are installed on the main body of the color image forming apparatus and thus, are also subject to limitations in their mechanical disposition, and must be disposed with them put together.

In the case below the lower limit value of the above-mentioned conditional expression (A), a remarkable color misregistration component will remain in both of the main scanning direction and the sub scanning direction, and particularly will affect the color misregistration in the scanning direction, and this is not good. In the main scanning direction, general magnification adjustment is effected by the registration detecting means, but in the case below the lower limit value of the conditional expression (A), the image height for effecting the general magnification adjustment will become a narrow range, and particularly in the most peripheral portion, much color misregistration component will remain.

Also, if the upper limit value of the conditional expression (A) is exceeded, a remarkable color misregistration component will remain in both of the main scanning direction and the sub scanning direction and further, the registration detecting means will be disposed outside the scanning area, and this will result in the bulkiness of the main body and the bulkiness of the device concerned in registration detection, and this is not good.

For the reasons set forth above, in the present embodiment, the registration detecting means are disposed at a position which satisfies $$|S|=0.54|T|.$$

Thereby the registration detection in the main scanning direction is kept good, and yet the color misregistration in the sub scanning direction is corrected well.

Figure 7:
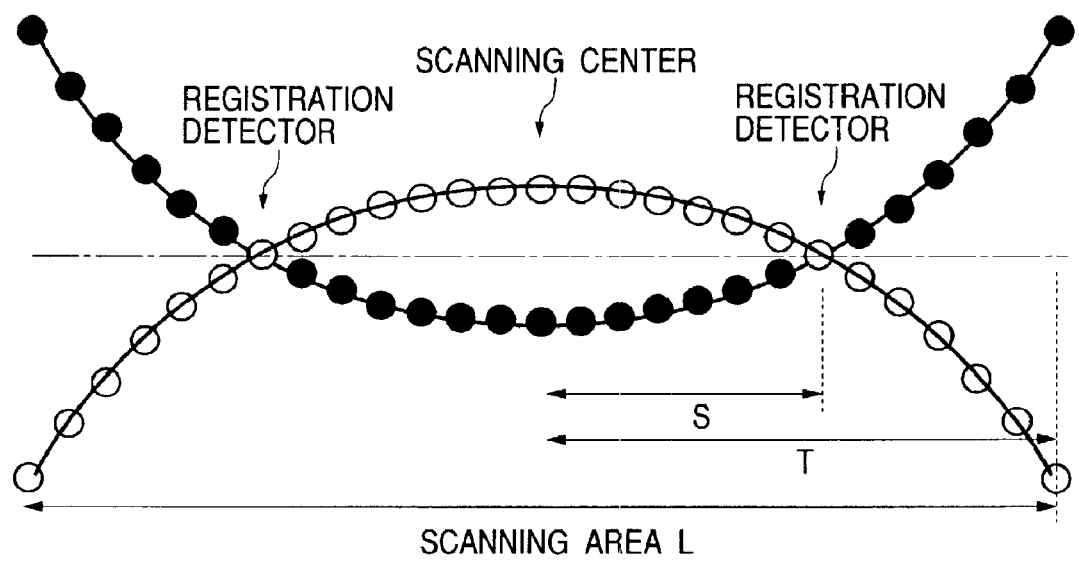
FIG. 7 shows the color misregistration component on the main body of the color image forming apparatus when the adjustment of the curvature of the scanning line is not effected.

FIG. 7 shows the state of the superposition of the scanning lines when the adjustment of the curvature of the scanning line is not effected. It will be seen that as compared with FIG. 6 in which the adjustment of the curvature of the scanning line was effected, a great color misregistration component remains particularly in the most peripheral portion. Even if the position of the registration detecting means is determined with attention paid to the registration detection only in the scanning direction, there will occur such a degree of color misregistration which will affect the image.

Figure 8:
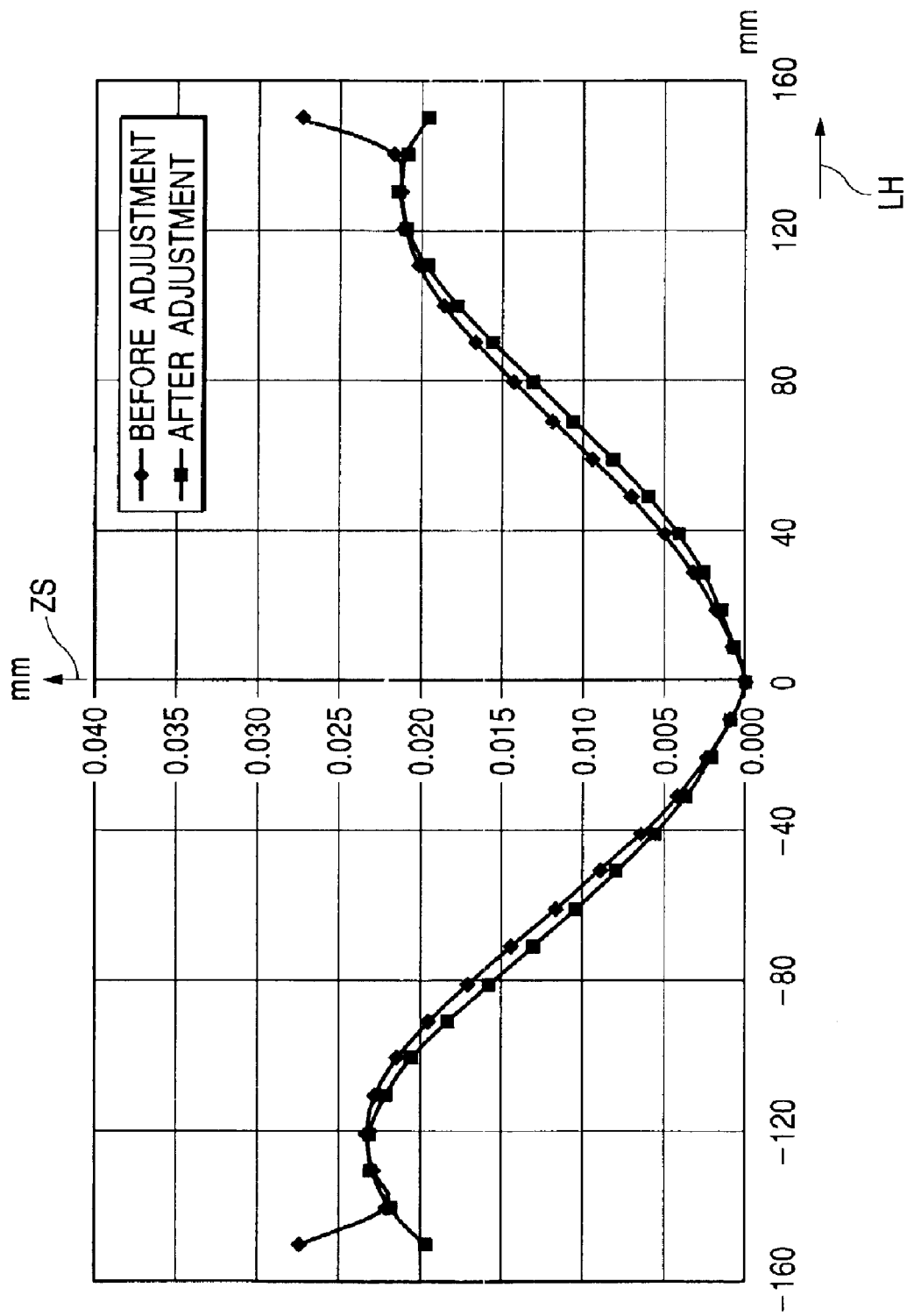
FIG. 8 shows the comparison between before and after the adjustment of the curvature of the scanning line when a certain accuracy error of Embodiment 1 of the present invention is added.

While in FIGS. 5 to 7, the description of the adjustment of the curvature of the scanning line has been made theoretically, in FIGS. 8 and 9, actually quantitative measurement has been effected.

FIG. 8 shows the curvature of the scanning line when in the scanning optical apparatus of the present embodiment, a certain error is added to each single piece accuracy and assemblage accuracy, and the curvature of the scanning line after the aforementioned curvature of the scanning line has been adjusted by the second lens 6b. In FIG. 8, the axis of abscissas represents the length LH in the main scanning direction, and the axis of ordinates represents the height ZS of the scanning line, and the deviation in the sub scanning direction at the scanning position when the center S0 of the scanning area is 0.

Also, FIG. 9 is a graph in which the amounts of color misregistration of two colors at which the amount of color misregistration in the sub scanning direction on the then main body of the color image forming apparatus becomes greatest are supposed.

As is apparent from FIGS. 8 and 9, the amount of color misregistration in the sub scanning direction is corrected by adjustment, and the final amount of color misregistration is within an allowable range. Here, it is desirable that the amount of color misregistration in the sub scanning direction attributable to the scanning optical apparatus be the order of 50 $\mu$m or less.

As described above, according to the present embodiment, it is possible to provide a color image forming apparatus in which the curvature of the scanning line is adjusted so that the scanning line which scans on the surface to be scanned may have at least two extremums in the range of the scanning area, whereby the color misregistration in the sub scanning direction can be reduced to thereby obtain a good color image.

While in the present embodiment, the scanning lens system 6 is constituted by the two lenses 6a and 6b, this is not restrictive, but the scanning lens system 6 may also be constituted, for example, by a single lens or three or more lenses.

Also, in the present embodiment, the condensing lens 2 and the cylindrical lens 4 may be eliminated, and the beam emitted from the light source means 1 may be directed directly to the deflecting surface 5a of the light deflector 5 through the aperture stop 3.

(Embodiment 2)

Figure 11:
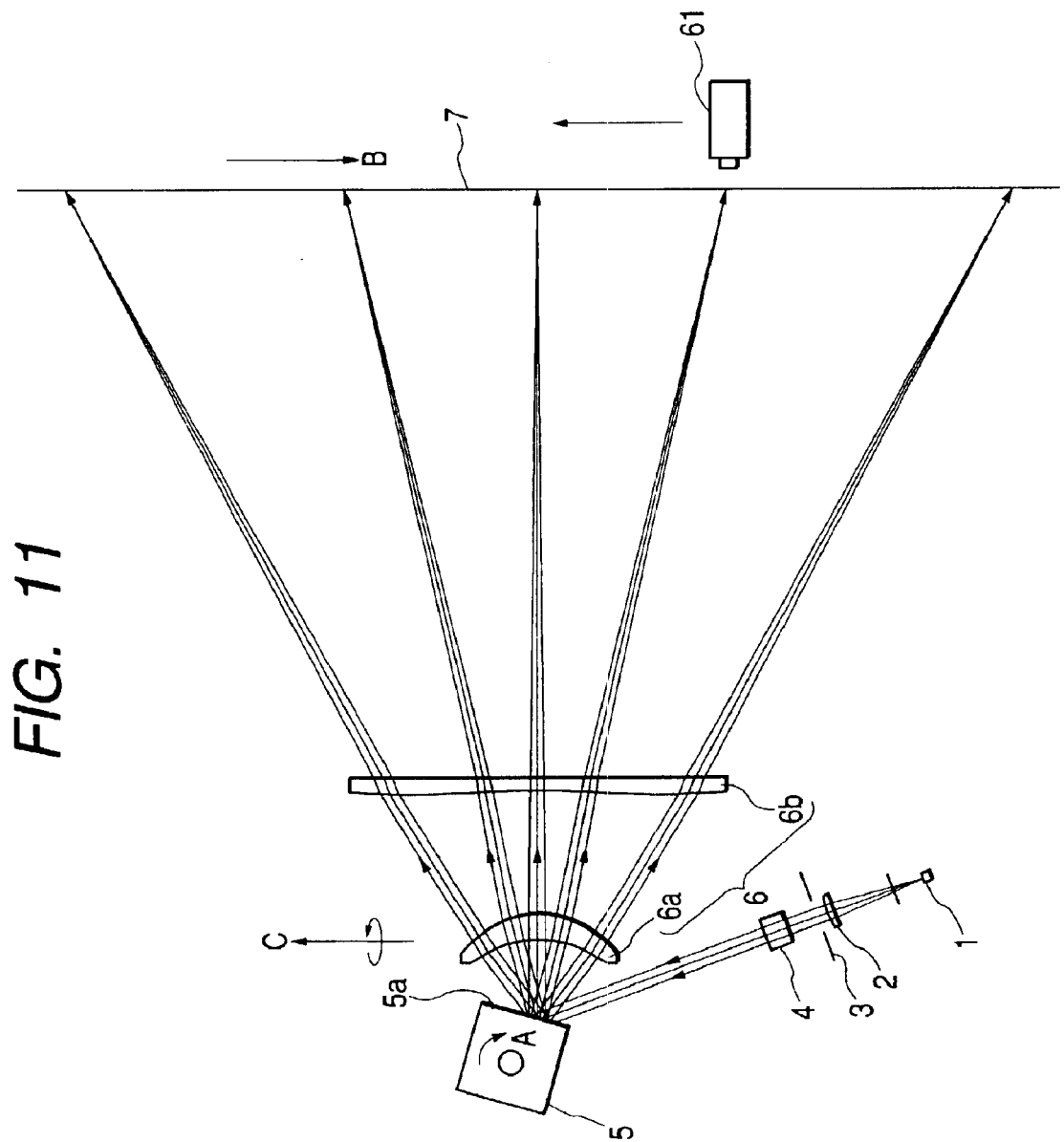
FIG. 11 is a main scanning cross-sectional view of a scanning optical apparatus according to Embodiment 2 of the present invention.

FIG. 11 is a cross-sectional view (main scanning cross-sectional view) of the essential portions of Embodiment 2 of the scanning optical apparatus of the present invention in the scanning direction.

The difference of the present embodiment from the afore-described Embodiment 1 is that the scanning line curvature adjusting mechanism is provided on the first lens 6a. In the other points, the construction and optical action of the present embodiment are substantially similar to those of Embodiment 1, whereby a similar effect is obtained.

That is, in the present embodiment, the scanning line curvature adjusting mechanism is provided on the first lens 6a of the first and second lenses 6a and 6b, and during the assembly of the scanning optical apparatus, detecting means 61 for detecting the position of the scanning line in the height direction thereof is disposed on the surface 7 to be scanned, and on the basis of the result of the detection obtained by the detecting means 61, the adjustment of the curvature of the scanning line is effected by the use of the first lens 6a.

The adjustment of the curvature of the scanning line, as shown in FIG. 11, is effected by rotating the first lens 6a about an axis C parallel to the scanning direction. At this time, there is the high possibility that like the occurrence factors of the curvature of the scanning line, the inclination of the scanning line occurs at the same time due to the single piece accuracy error of each part, the assemblage accuracy error of the part, etc. Accordingly, it is desirable to effect the adjustment of the inclination of the scanning line before the adjustment of the curvature of the scanning line is effected, and effect the adjustment of the curvature of the scanning line with the inclination component eliminated.

Also, in the present embodiment, as in the aforedescribed Embodiment 1, the registration detecting means are disposed at a position satisfying the above-mentioned conditional expression (A). In the present embodiment, the registration detecting means are disposed at a position satisfying $|S|=0.54|T|$.

Thereby the registration detection in the scanning direction is kept good, and yet the color misregistration in the sub scanning direction is corrected well.

Figure 12:
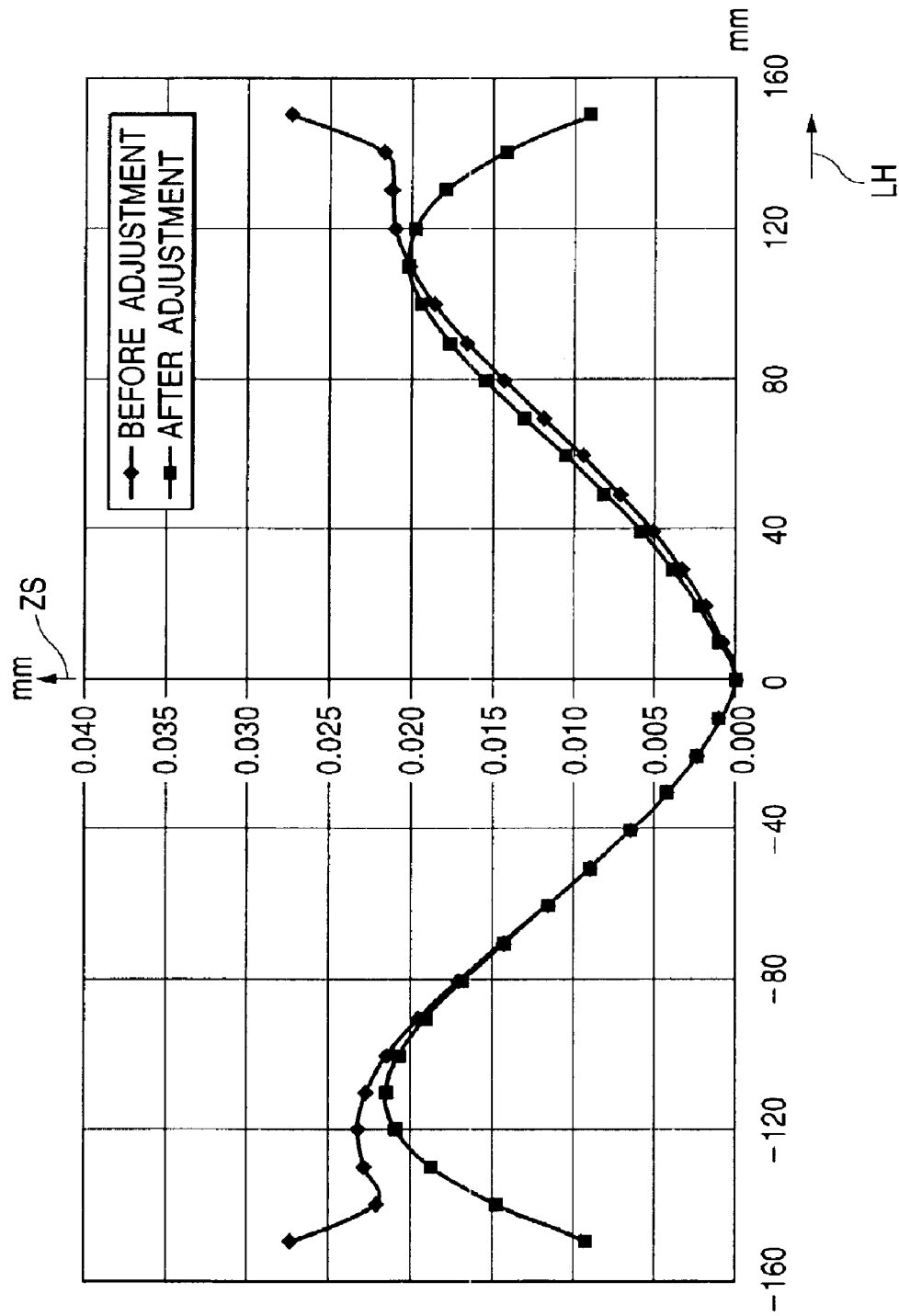
FIG. 12 shows the comparison between before and after the adjustment of the curvature of the scanning line when a certain accuracy error of Embodiment 2 of the present invention is added.

FIG. 12 shows the curvature of the scanning line when in the scanning optical apparatus of the present embodiment, a certain error is added to each single piece accuracy and assemblage accuracy, and the curvature of the scanning line after the aforementioned curvature of the scanning line has been adjusted by the first lens 6a. In FIG. 12, the axis of abscissas represents the length LH in the main scanning direction, and the axis of ordinates represents the height ZS of the scanning line, and the deviation in the sub scanning direction at the scanning position when the center S0 of the scanning area is 0.

Figure 13:
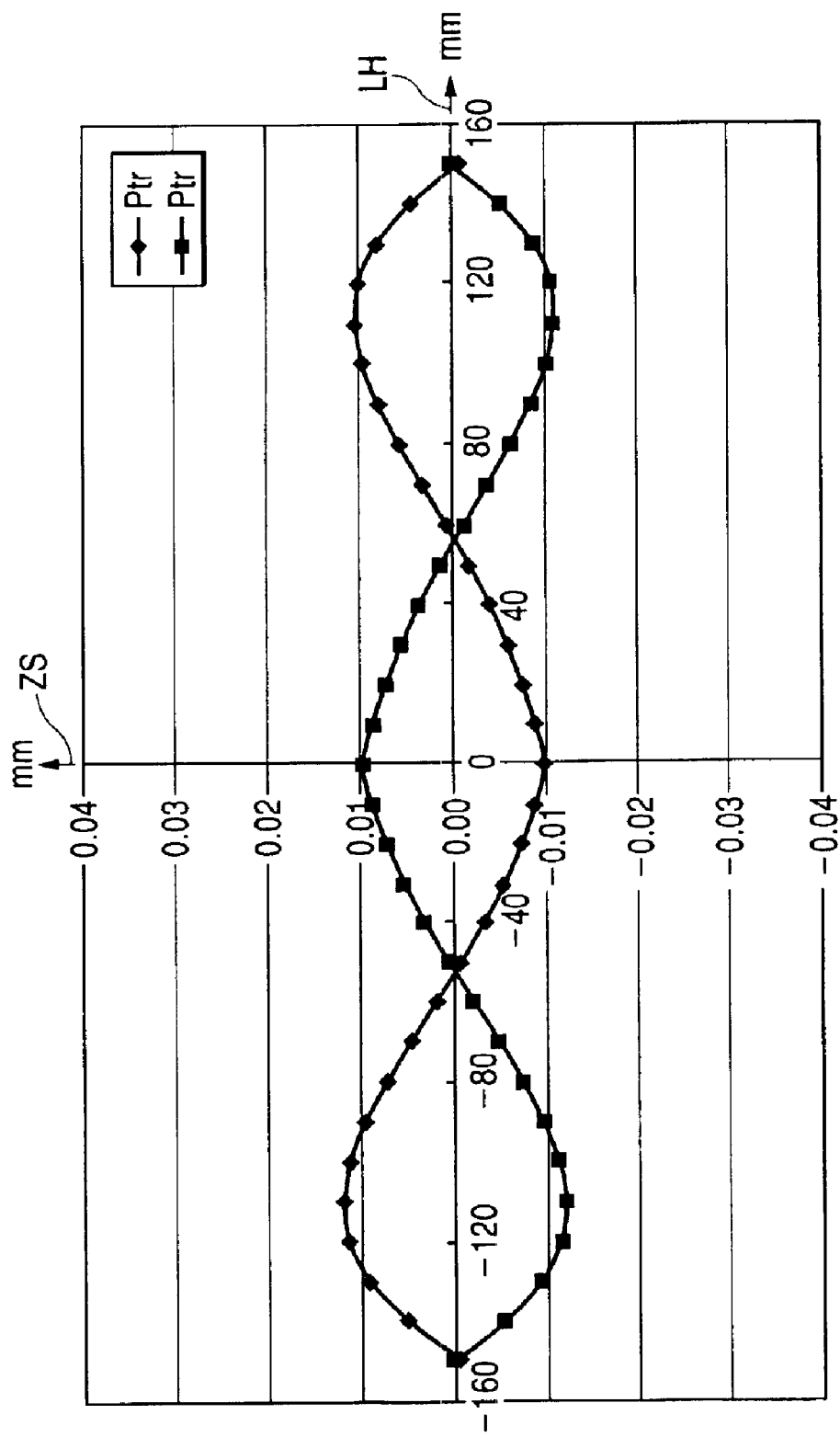
FIG. 13 shows a color misregistration component on the main body of the color image forming apparatus after the adjustment of the curvature of the scanning line when a certain accuracy error of Embodiment 2 of the present invention is added.

Also, FIG. 13 is a graph in which the amounts of color misregistration of two colors at which the amount of color misregistration in the sub scanning direction on the then main body of the color image forming apparatus becomes greates are supposed.

As is apparent from FIGS. 12 and 13, the amount of color misregistration in the sub scanning direction is corrected by adjustment and the final amount of color misregistration is also within an allowable range. Here, it is desirable that the amount of color misregistration in the sub scanning direction attributable to the scanning optical apparatus be the order of 50 $\mu$m or less.

As described above, according to the present invention, it becomes possible to provide a color image forming apparatus in which the curvature of the scanning line is adjusted so that the scanning line scanning on the surface to be scanned may have at least two (in the present embodiment, three) extremums within the range of the scanning area, whereby the color misregistration in the sub scanning direction can be reduced to thereby obtain a good color image.

While as the means for adjusting the curvature of the scanning line, in the aforedescribed Embodiment 1, the second lens 6b, and in the above-described Embodiment 2, the first lens 6a, is rotated about the axis C parallel to the scanning direction, this is not restrictive, but both of the first and second lenses may be rotated.

Also, while as the means for adjusting the curvature of the scanning line, in each of Embodiments 1 and 2, the lens is tilted (rotated), this is not restrictive, but for example, the lens may be shifted, or tilted and shifted in the sub scanning direction.

In the present invention, as the means for adjusting the curvature of the scanning line, besides the lens, a scanning optical element such as a reflecting mirror or a diffracting element may be shifted, or tilted and shifted in the sub scanning direction.

While in the color image forming apparatus of Embodiment 1, design is made such that each of the scanning lines described on the photosensitive drums 21, 22, 23 and 24 by the light beams 41, 42, 43 and 44 incident on respective ones of the photosensitive drums 21, 22, 23 and 24 may have three extremums in the effective range of the scanning area, this is not restrictive.

The present invention can also be applied to a type in which image recording is effected on a single photosensitive drum by two or more light beams.

For example, the present invention can also be applied to such a construction that each of two scanning lines described by two light beams incident on a single photosensitive drum obtains three extremums (two or more extremums) in the effective range of the scanning area.

(Embodiment 3)

Figure 14:
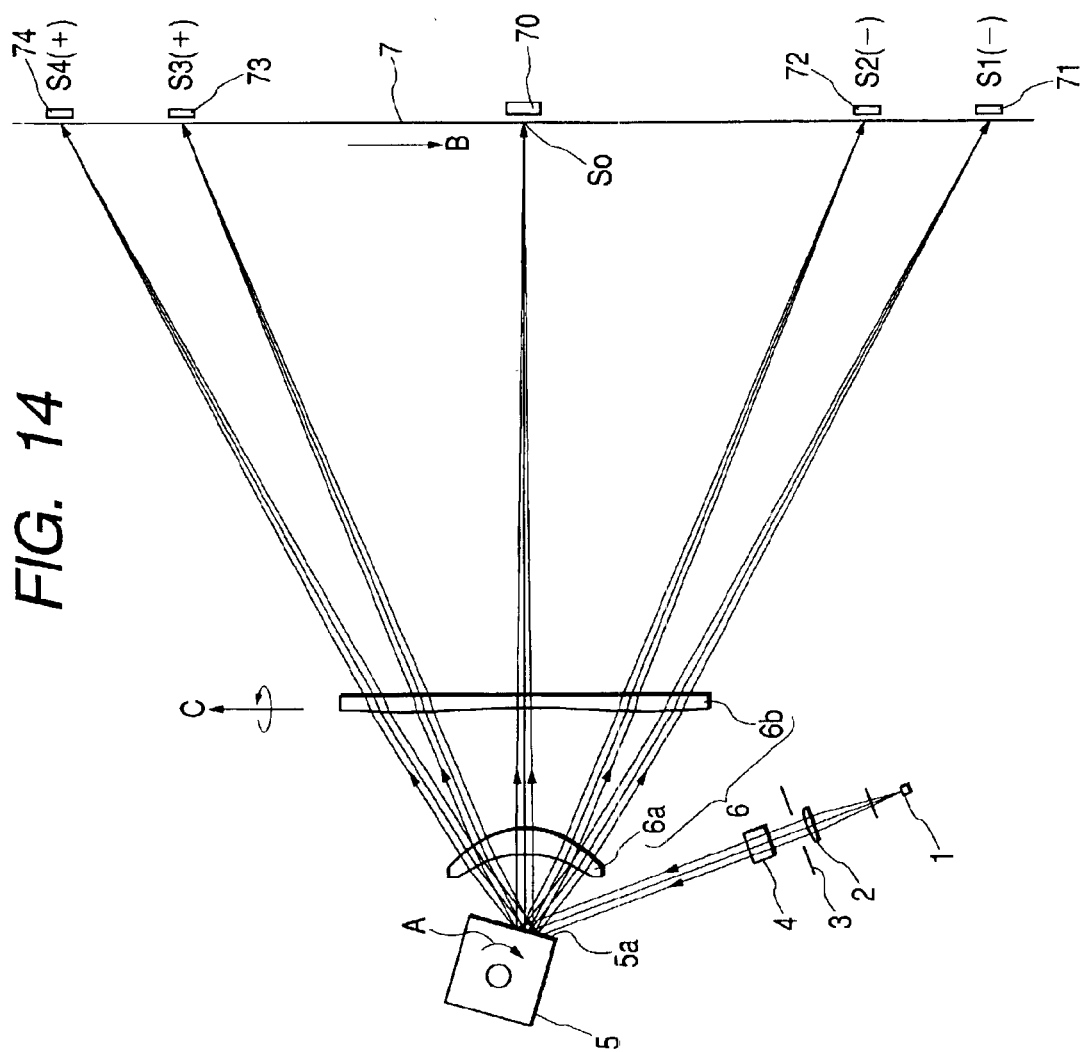
FIG. 14 is a main scanning cross-sectional view of the scanning optical apparatus according to Embodiment 3 of the present invention.
Figure 15A:
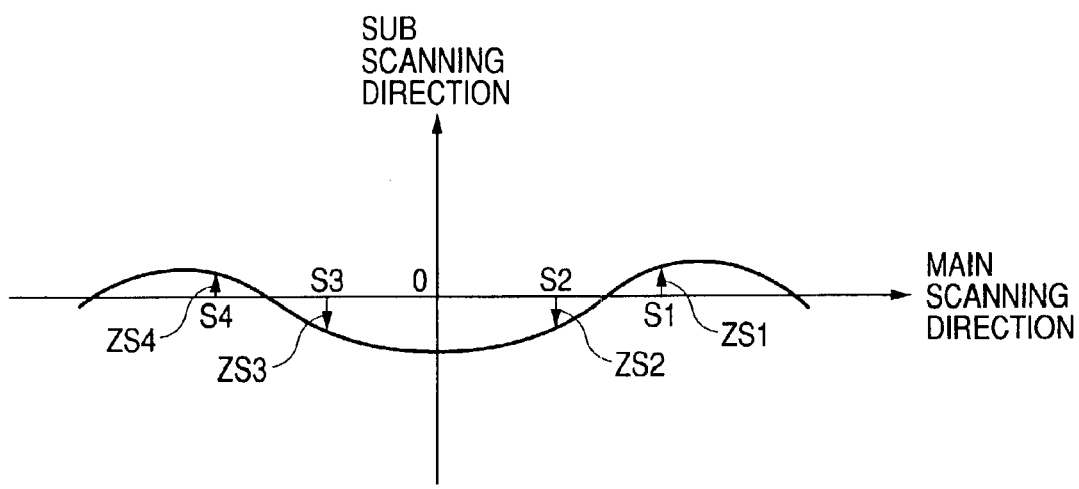
FIGS. 15A and 15B show the curvature of the scanning line in Embodiment 3 of the present invention.
Figure 15B:
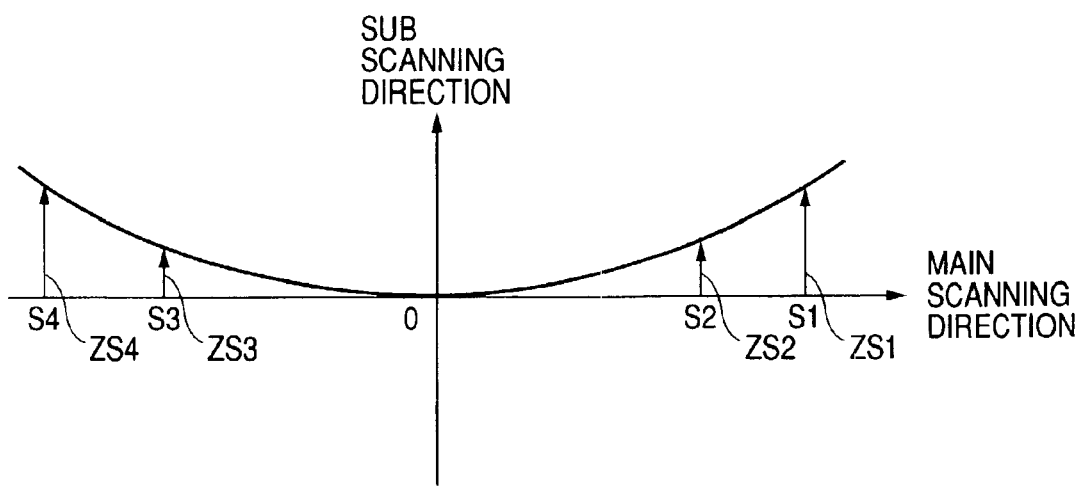
Figure 17:
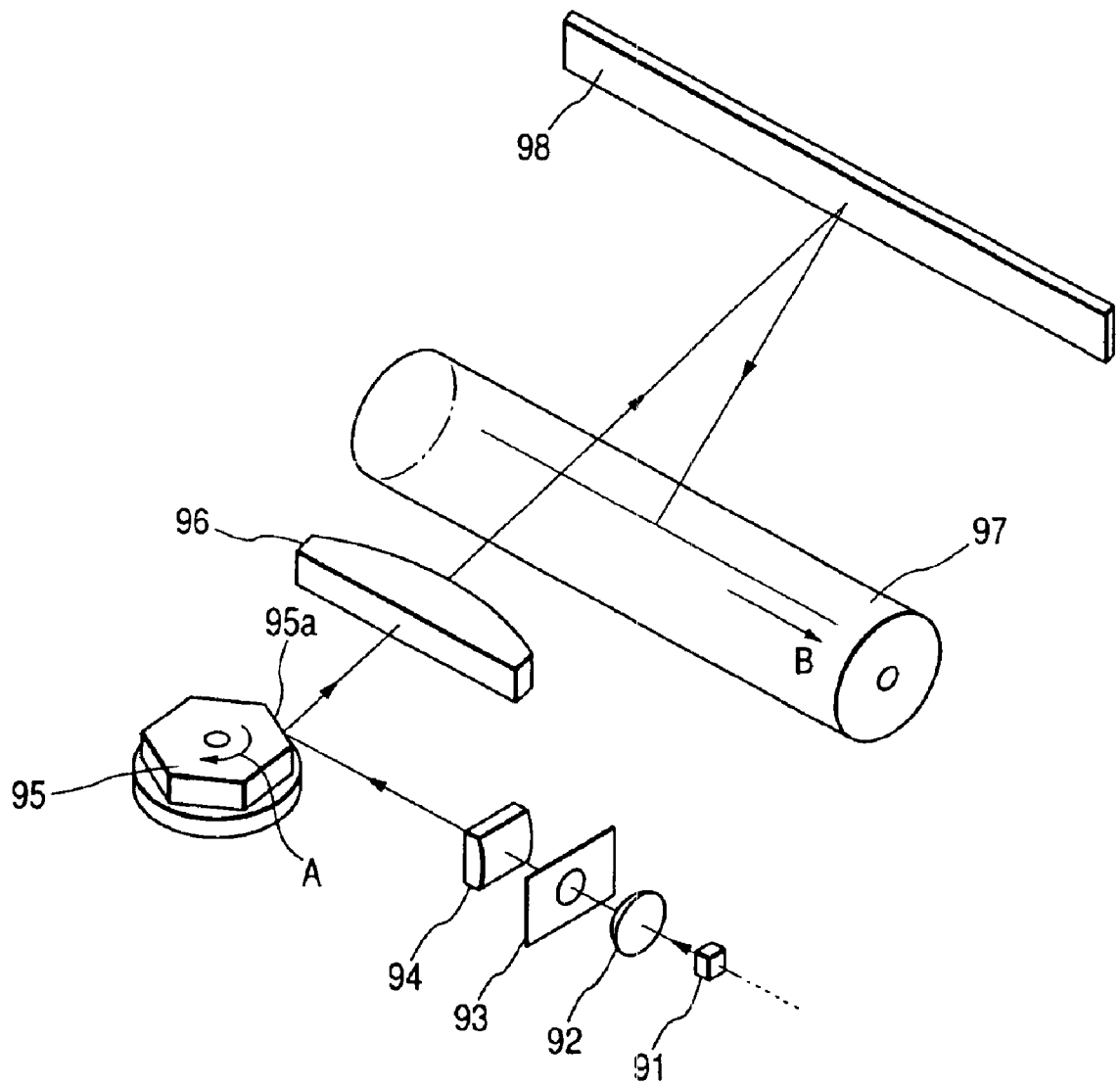
FIG. 17 is a schematic view of the essential portions of a conventional scanning optical apparatus.
Figure 18:
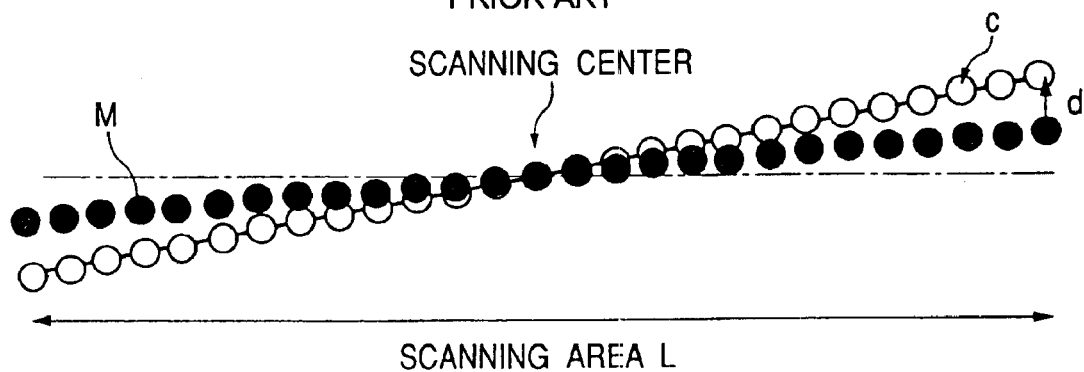
FIG. 18 shows the state before the adjustment of the inclination of the scanning line.
Figure 19:
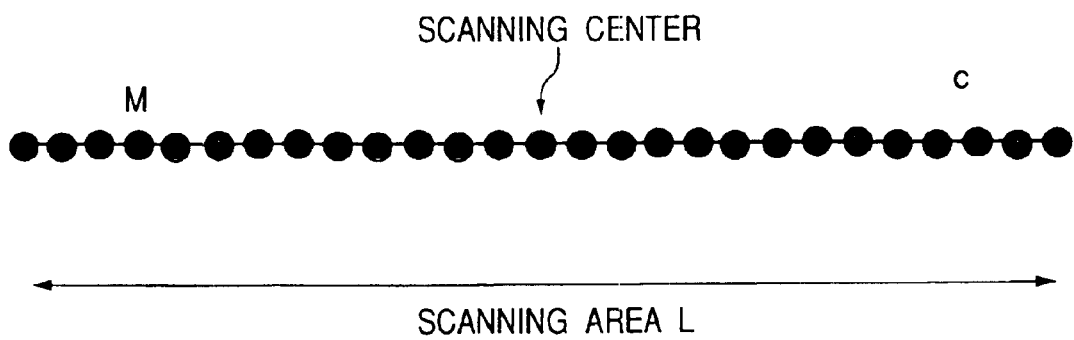
FIG. 19 shows the state after the adjustment of the inclination of the scanning line.
Figure 20:
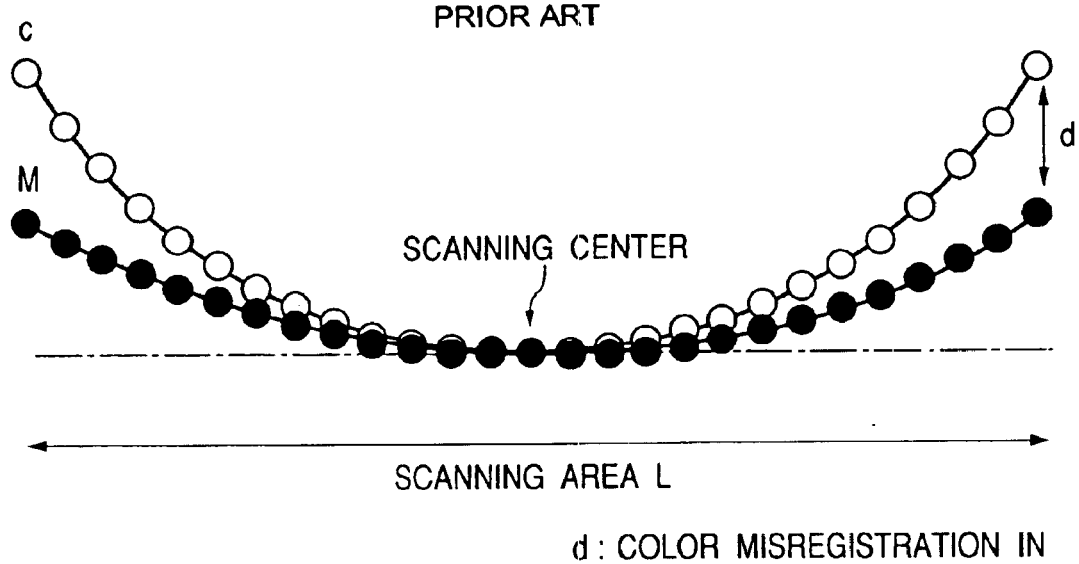
FIG. 20 shows the curvature of the scanning line.
Figure 21:
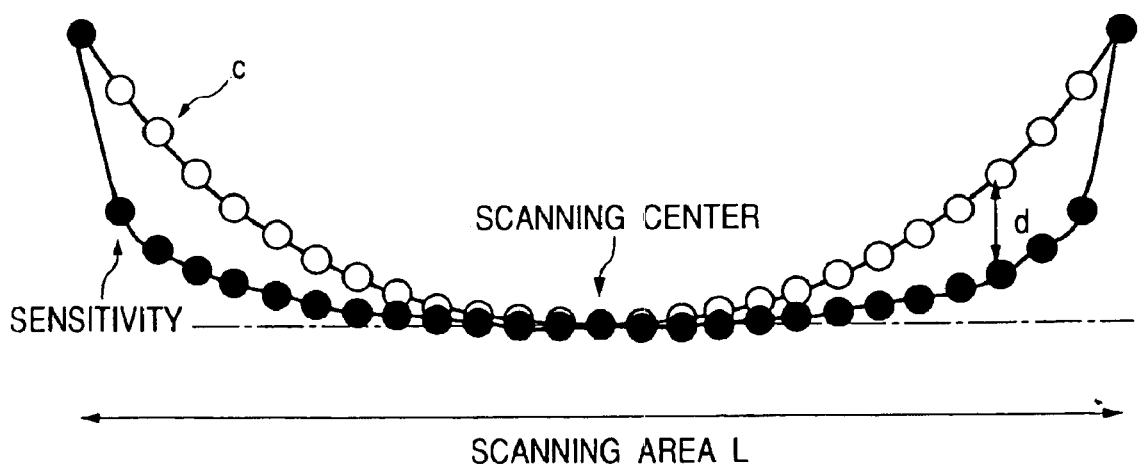
FIG. 21 shows the curvature of the scanning line.
Figure 22:
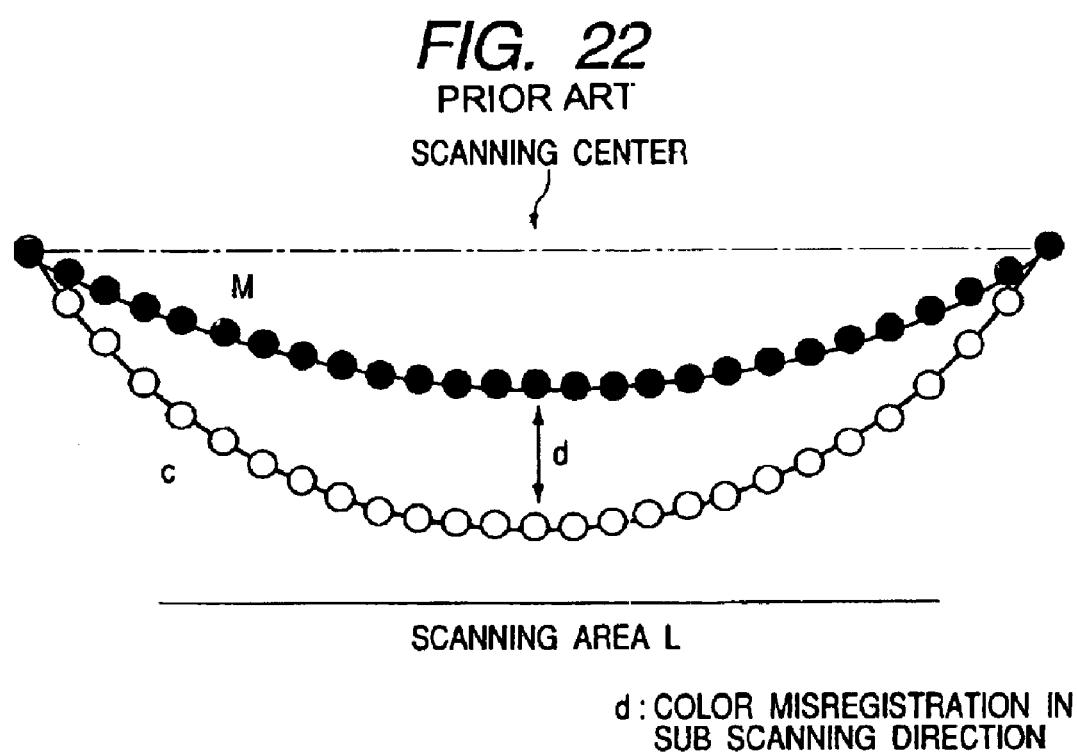
FIG. 22 shows the curvature of the scanning line.

FIG. 14 is a cross sectional view (main scanning cross-sectional view) of the essential portions of a scanning optical apparatus according to Embodiment 3 of the present invention in the scanning direction, and each of FIGS. 15A and 15B shows the curvature of the scanning line in FIG. 14. In FIGS. 14, 15A and 15B, the same elements as the elements shown in FIG. 1 are given the same reference characters.

The difference of the present embodiment from the aforedescribed Embodiment 1 is that detecting means is disposed at each of the positions of a plurality of image heights, and on the basis of the result of the detection obtained by each detecting means the curvature of the scanning line is adjusted so as to satisfy conditional expressions (1) and (2) which will be described later. In the other points, the construction and optical action of the present embodiment are substantially similar to those of Embodiment 1, whereby a similar effect is obtained.

That is, in the present embodiment, the construction of the scanning optical apparatus itself is equal to that of Embodiment 1, but the difference thereof from the latter is that in the adjustment of the curvature of the scanning line effected during the assembly of the scanning optical apparatus, detecting means for detecting the position of the scanning line in the height direction thereof is disposed on the surface 7 to be scanned to thereby detect the scanning line in the entire scanning area, but instead of doing so, in order to simplify the adjusting step, as shown in FIG. 14, detecting means 70 to 74 are disposed at five locations of image heights S1, S2, S3, S4 and the central image height S0 of scanning, and on the basis of the results of the detection obtained by the detecting means 70 to 74, the curvature of the scanning line is adjusted so as to satisfy conditional expressions (1) and (2) which will be described later.

In FIG. 14, the signs of the image heights are such that the direction opposite to the scanning direction B from the center S0 of the scanning area is plus (+), and the scanning direction B is minus (−).

The detecting means 70 disposed at the image height S0 at the center of the scanning area is for detecting the height component and the offset amount of the entire scanning line, and the adjustment of the curvature of the scanning line is effected on the basis of the results of the detection by the four detection means 71, 72, 73 and 74 disposed at the other image heights S1, S2, S3 and S4. The adjustment of the curvature of the scanning line, as shown in FIG. 14, is effected by rotating the second lens 6b about an axis C parallel to the main scanning direction by a scanning line curvature adjusting mechanism.

Instead of the second lens 6b, the first lens 6a or both of the first and second lenses 6a and 6b may be rotated, and instead of being tilted (rotated), for example, the lens or lenses may be shifted, or tilted and shifted in the sub scanning direction.

Here, each element is set such that when the scanning line heights at the positions of the four image heights S1, S2, S3 and S4 from the center of the scanning area within the range of the effective scanning area are defined as Zs1, Zs2, Zs3 and Zs4, the scanning line scanning on the surface to be scanned satisfies the conditions that $$S1 < S2 < 0 < S3 < S4 \quad (1)$$

$$-0.02 \text{ mm} \leq (Zs1+Zs4)-(Zs2+Zs3) \leq 0.02 \text{ mm} \quad (2).$$

In the present embodiment, on the basis of the results of the detection obtained by the respective detecting means, the curvature of the scanning line is adjusted so as to satisfy the above-mentioned conditional expression (1) and (2), whereby it becomes possible to effect the adjustment of the curvature of the scanning line equivalent to that in the aforedescribed Embodiment 1.

If the range of at least one of the above-mentioned conditional expression (1) and (2) is departed from, particularly the color misregistration component in the sub scanning direction in the most peripheral portion suddenly increases, and this is not good.

In the present embodiment, each element is set in such a manner that $$-S1=S4$$

$$-S2=S3.$$

This is balanced so that when the amounts of curvature of the scanning line at the image heights ±S1 and the image heights ±S2 are defined as WS1 and WS2, the difference between the maximum value and minimum value of the curvature of the scanning line may assume the smallest value when $$WS1=WS2$$

is satisfied.

That is, from $$WS1=(Zs1+Zs4)/2-Z0$$

$$WS2=(Zs2+Zs3)/2-Z0$$

Where Z0 is the height of the scanning line at the center of scanning, $$WS1=WS2,$$

$$(Zs1+Zs4)=(Zs2+Zs3).$$

Hence, assuming that $$\alpha=(Zs1+Zs4)-(Zs2+Zs3),$$

by adjusting this α so as to become small, the difference between the maximum value and minimum value of the curvature of the scanning line is balanced so as to assume the smallest value.

If the absolute value of this α exceeds 20 μm, color misregistration will come to appear remarkably in the image and become unallowable. At this time, there is the high possibility that like the occurrence factors of the curvature of the scanning line, the inclination of the scanning line also occurs at the same time due to the single piece accuracy error of each part, the assemblage accuracy error of the part, etc., but by effecting adjustment based on the above-mentioned conditional expressions (1) and (2), the adjustment of the curvature of the scanning line becomes possible even when there is an inclination component.

In the present embodiment,

S1=−150 mm

S2=−110 mm

S3=110 mm

S4=150 mm

Also, in the present embodiment, as in the aforedescribed Embodiment 1, the registration detecting means are disposed at a position which satisfies the above-mentioned conditional expression (A). In the present embodiment, the registration detecting means are disposed at a position which satisfies $$|S|=0.54|T|$$

Thereby the registration detection in the scanning direction is kept good, and yet the color misregistration in the sub scanning direction is corrected well.

The adjustment of the curvature of the scanning line in the present embodiment at this time and the color misregistration component in the sub scanning direction on the main body of the color image forming apparatus are equal to those of FIGS. 8 and 9 in the aforedescribed Embodiment 1.

FIG. 15A shows the curvature of the scanning line which has three extremums, and FIG. 15B shows the curvature of the scanning line which may have any number of extremums if it satisfies the above-mentioned conditional expressions (1) and (2).

In FIG. 15B, the number of extremums is one.

As described above, according to the present embodiment, it becomes possible to provide a color image forming apparatus in which detecting means is disposed at each of the positions of a plurality of image heights, and on the basis of the results of the detection obtained by the respective detecting means, the curvature of the scanning line is adjusted so as to satisfy conditional expressions (1) and (2), whereby the color misregistration in the sub scanning direction can be reduced to thereby obtain a good color image.

(Embodiment 4)

FIG. 16 is a perspective view of the essential portions of Embodiment 4 when a plurality of scanning optical apparatuses according to Embodiment 3 of the present invention are used in a color image forming apparatus. In FIG. 16, the same elements as the elements shown in FIG. 1 are given the same reference characters.

The difference of the present embodiment from the aforedescribed Embodiment 3 is that the adjustment of the curvature of the scanning line is effected on the main body of the color image forming apparatus. In the other points, the construction and optical action of the present embodiment are substantially similar to those of Embodiment 3, whereby a similar effect is obtained.

That is, in the present embodiment, as shown in FIG. 16, detecting means 71, 72, 73 and 74 are disposed at positions near registration detecting means 69 and 70 on the main body and corresponding to image heights S1, S2, S3 and S4, respectively, and registration marks formed at the four image heights are detected to thereby calculate the state of the curvature of the scanning line by an internal circuits and feed back the adjustment of the curvature of the scanning line. The adjustment of the curvature of the scanning line, as in the aforedescribed Embodiment 3, is effected by rotating the second lens 6b about the axis C parallel to the main scanning direction by the scanning line curvature adjusting mechanism.

Instead of the second lens 6b, the first lens 6a or both of the first and second lenses 6a and 6b may be rotated, and instead of being tilted (rotated), for example, the lens or lenses may be shifted, or tilted and shifted in the sub scanning direction.

In the present embodiment, as in the aforedescribed Embodiment 3, on the basis of the results of the detection obtained by the respective detecting means, the adjustment of the curvature of the scanning line is effected so as to satisfy conditional expressions (1) and (2).

In the present embodiment,

S1=−150 mm

S2=−110 mm

S3=110 mm

S4=150 mm.

Thereby it becomes possible to effect the adjustment of the curvature of the scanning line equivalent to that in Embodiment 1 and Embodiment 3.

Also, in the present embodiment, as in the aforedescribed Embodiment 1, the registration detecting means are disposed at a position which satisfies the above-mentioned conditional expression (A). In the present embodiment, the registration detecting means are disposed at a position which satisfies $|S|=0.54|T|$.

Thereby the registration detection in the scanning direction is kept good, and yet the color misregistration in the sub scanning direction is corrected well.

The adjustment of the curvature of the scanning line in the present embodiment at this time and the color misregistration component in the sub scanning direction on the main body of the color image forming apparatus are equal to those of FIGS. 8 and 9 in Embodiment 1 and Embodiment 3.

As described above, according to the present embodiment, there can be achieved a color image forming apparatus in which on the basis of the results of the detection obtained by the respective detection means, the curvature of the scanning line is adjusted so as to satisfy the above-mentioned conditional expressions (1) and (2), whereby the color misregistration in the sub scanning direction can be reduced to thereby obtain a good color image.

According to the present invention, as previously described, there can be achieved a scanning optical apparatus in which the curvature of the scanning line is adjusted so that the scanning line scanning on the surface to be scanned may have at least two extremums within the range of the scanning area, whereby the color misregistration in the sub scanning direction can be reduced to thereby obtain a good color image output, and a color image forming apparatus using the same.

Also, according to the present invention, as previously described, there can be achieved a scanning optical apparatus in which the curvature of the scanning line is adjusted so as to satisfy conditional expressions (1) and (2), whereby the color misregistration in the sub scanning direction can be reduced to thereby obtain a good color image output, and a color image forming apparatus using the same.

What is claimed is:

1. A color image forming apparatus comprising:

a plurality of scanning optical apparatuses for forming images of different colors, wherein each scanning optical apparatus comprises:

scanning optical means for causing the beam deflected by said deflecting means to be imaged in a spot shape on a surface to be scanned, wherein a scanning line scanning on said surface to be scanned has two or more extremums within an effective range of a scanning area;

a plurality of image bearing members disposed on said surfaces to be scanned of said plurality of scanning optical apparatuses, respectively; and two or more registration detecting means for detecting a color misregistration component, wherein said two or more registration detecting means are disposed at an intermediate image height between the center of an effective scanning area and the end of the effective scanning area in the main scanning direction, wherein when the distance from the center of the effective scanning area to the end of the effective scanning area in the main scanning direction is defined as T, and the distance from the center of the effective scanning area to the detecting position of said registration detecting means in the main scanning direction is defined as S, said registration detecting means are disposed at such a position as satisfies $0.3|T|<|S|<|T|$.

2. A color image forming apparatus according to claim 1, wherein each of said plurality of scanning optical apparatuses further comprise a scanning line curvature adjusting mechanism, wherein the two or more extremums of the scanning line are obtained by adjusting the curvature of the scanning line by said scanning line curvature adjusting mechanism.

3. A color image forming apparatus according in claim 2, wherein said scanning line curvature adjusting mechanism tilts or/and shifts one or more of scanning optical elements constituting said scanning optical means to thereby adjust the curvature of the scanning line.

4. A color image forming apparatus according to claim 1, wherein said color image forming apparatus includes a printer controller for converting a color signal inputted from an external device into image data of the different colors, and inputting them to the respective scanning optical apparatuses.

5. A color image forming apparatus comprising:

a plurality of scanning optical apparatuses for forming images of different colors, wherein each scanning optical apparatus comprises;

scanning optical means for causing the beam deflected by said deflecting means to be imaged in a spot shape on a surface to be scanned, wherein when the scanning line heights at the positions of four image heights S1, S2, S3 and S4 within the range of an effective scanning area are defined as Zs1, Zs2, Zs3 and Zs4, respectively, a scanning line scanning on said surface to be scanned satisfies the conditions that $$S1 < S2 < 0 < S3 < S4 \quad (1)$$

$$-0.02 \text{ mm} \leq (Zs1+Zs4)-(Zs2+Zs3) \leq 0.02 \text{ mm} \quad (2);$$

a plurality of image bearing members disposed on the surfaces to be scanned of the plurality of scanning optical apparatuses, respectively; and two or more registration detecting means for detecting a color misregistration component, wherein said two or more registration detecting means are disposed at an intermediate image height between the center of an effective scanning area and the end of the effective scanning area in the main scanning direction, wherein when the distance from the center of the effective scanning area to the end of the effective scanning area in the main scanning direction is defined as T, and the distance from the center of the effective scanning area to the detecting position of said registration detecting means in the main scanning direction is defined as S, said registration detecting means are disposed at such a position as satisfies $$0.3|T| < |S| < |T|.$$

6. A color image forming apparatus according to claim 5, wherein each of said plurality of scanning optical apparatuses each further comprise a scanning line curvature adjusting mechanism, wherein said mechanism adjusts the curvature of the scanning line so as to satisfy said conditional expressions (1) and (2).

7. A color image forming apparatus according to claim 6, wherein said scanning line curvature adjusting mechanism tilts or/and shifts one or more scanning optical elements constituting said scanning optical means to thereby adjust the curvature of the scanning line.

8. A color image forming apparatus according to claim 5, wherein said color image forming apparatus includes a printer controller for converting a color signal inputted from an external device into image data of the different colors and inputting them to the respective scanning optical apparatuses.

\* \* \* \* \*